US012208408B2

(12) United States Patent
Forrest

(10) Patent No.: US 12,208,408 B2
(45) Date of Patent: Jan. 28, 2025

(54) SPRAY BOTTLE HAVING HINGING AND LOCKING SPRAY HEAD ASSEMBLY WITH REPLACEABLE COMPONENTS, AND MULTI-LABEL SYSTEMS

(71) Applicant: Nexshift, Inc., Fort Myers, FL (US)

(72) Inventor: Paul B. Forrest, Cary, NC (US)

(73) Assignee: Nexshift, Inc., Fort Myers, FL (US)

( * ) Notice: Subject to any disclaimer, the term of this patent is extended or adjusted under 35 U.S.C. 154(b) by 64 days.

(21) Appl. No.: 17/507,147

(22) Filed: Oct. 21, 2021

(65) Prior Publication Data

US 2023/0129298 A1 Apr. 27, 2023

(51) Int. Cl.
*B05B 11/00* (2023.01)
*B05B 11/04* (2006.01)
(Continued)

(52) U.S. Cl.
CPC .......... *B05B 15/68* (2018.02); *B05B 11/0008* (2013.01); *B05B 11/0027* (2013.01); *B05B 11/0091* (2013.01); *B05B 11/043* (2013.01); *B05B 11/047* (2013.01); *B05B 11/1009* (2023.01); *B05B 11/1011* (2023.01); *B05B 11/103* (2023.01); *B05B 15/18* (2018.02); *B05B 15/63* (2018.02); *B05B 15/652* (2018.02); *B05B 15/658* (2018.02); *G09F 3/04* (2013.01);
(Continued)

(58) Field of Classification Search
CPC ... B05B 15/68; B05B 11/0091; B05B 11/043; B05B 11/047; B05B 11/1009; B05B 15/63; B05B 15/658; B05B 11/0037; B05B 3/0463; B05B 15/30; B05B 15/18; B05B 11/1067; B05B 11/0027; B05B 11/0008; B05B 11/1011; B05B 11/103; B05B 15/652; G09F 2003/0273; G09F 3/04
See application file for complete search history.

(56) References Cited

U.S. PATENT DOCUMENTS 2,685,316 A 8/1954 Krasno
3,288,334 A 11/1966 Corsette
(Continued)

OTHER PUBLICATIONS

ISA/US, International Search Report and Written Opinion for International application No. PCT/US22/78447 dated Apr. 5, 2023, 12 pages.
(Continued)

*Primary Examiner* — Frederick C Nicolas
(74) *Attorney, Agent, or Firm* — NK Patent Law

(57) ABSTRACT

A spray bottle assembly includes a bottle having a neck, and a spray head assembly having a base cap configured to removably attach to the neck. The base cap has a feature that rotationally locks the base cap relative to the neck to constrain the spray head assembly in a predetermined plane. A multi-label system for a spray bottle includes: at least one strip, the strip including connected labels with differing information printed on each side, each label including a ring for positioning on a neck of the spray bottle. A pumping mechanism for a spray bottle includes: a unibody plunger having a sleeve section that variably inverts and overlaps an end thereof thus defining an internal volume that varies with the disposition of the sleeve section relative to the end. A pivoting head section that allows servicing of functional seal components.

18 Claims, 16 Drawing Sheets

(51) Int. Cl.

| | |
|---|---|
| ***B05B 11/10*** | (2023.01) |
| ***B05B 15/18*** | (2018.01) |
| ***B05B 15/63*** | (2018.01) |
| ***B05B 15/652*** | (2018.01) |
| ***B05B 15/658*** | (2018.01) |
| ***B05B 15/68*** | (2018.01) |
| ***G09F 3/04*** | (2006.01) |
| ***G09F 3/20*** | (2006.01) |
| *B05B 3/04* | (2006.01) |
| *B05B 15/30* | (2018.01) |
| *G09F 3/02* | (2006.01) |

(52) U.S. Cl.

CPC ......... *B05B 3/0463* (2013.01); *B05B 11/0037* (2013.01); *B05B 11/1067* (2023.01); *B05B 15/30* (2018.02); *G09F 2003/0273* (2013.01)

(56) References Cited

U.S. PATENT DOCUMENTS

| | | | | |
|---|---|---|---|---|
| 3,367,380 | A | 2/1968 | Dickey | |
| 3,559,847 | A | 2/1971 | Goodrich | |
| 3,595,441 | A | 7/1971 | Grosjean | |
| 3,898,945 | A | 8/1975 | Rohowetz | |
| 3,926,341 | A | 12/1975 | Lhoest | |
| 4,018,640 | A * | 4/1977 | Amberg | B65D 55/0854 156/203 |
| 4,032,028 | A * | 6/1977 | Reiss | B65D 50/043 215/217 |
| 4,035,004 | A | 7/1977 | Hengesbach | |
| 4,044,836 | A | 8/1977 | Martin et al. | |
| 4,146,133 | A | 3/1979 | Bogorad et al. | |
| 4,155,487 | A | 5/1979 | Blake | |
| 4,157,103 | A | 6/1979 | La Fleur | |
| 4,193,518 | A | 3/1980 | Holmes | |
| 4,256,154 | A | 3/1981 | Black | |
| 4,265,374 | A | 5/1981 | Sebalos | |
| 4,456,134 | A | 6/1984 | Cooper | |
| 4,492,313 | A | 1/1985 | Touzani | |
| 4,526,280 | A | 7/1985 | Taylor | |
| 4,558,821 | A | 12/1985 | Tada et al. | |
| 4,618,076 | A | 10/1986 | Silvenis | |
| 4,686,814 | A | 8/1987 | Yanase | |
| 4,705,191 | A | 11/1987 | Itzel et al. | |
| 4,781,311 | A | 11/1988 | Dunning et al. | |
| 4,790,361 | A | 12/1988 | Jones et al. | |
| 4,830,235 | A | 5/1989 | Miller | |
| 4,850,509 | A | 7/1989 | Hollenberg | |
| 4,865,211 | A | 9/1989 | Hollingsworth | |
| 4,867,374 | A | 9/1989 | Murray et al. | |
| 4,925,066 | A | 5/1990 | Rosenbaum | |
| 5,031,798 | A | 7/1991 | Wild | |
| 5,054,631 | A * | 10/1991 | Robbins, III | A47G 21/18 220/666 |
| 5,056,685 | A | 10/1991 | Wild | |
| 5,083,678 | A | 1/1992 | Waring | |
| 5,114,011 | A | 5/1992 | Robbins, III | |
| 5,152,431 | A | 10/1992 | Gardner et al. | |
| 5,156,295 | A | 10/1992 | Gordon et al. | |
| 5,156,299 | A | 10/1992 | De Caluwe et al. | |
| 5,160,071 | A | 11/1992 | Wright | |
| 5,174,458 | A | 12/1992 | Segati | |
| 5,195,664 | A | 3/1993 | Rhea | |
| 5,206,037 | A | 4/1993 | Robbins, III | |
| 5,226,551 | A | 7/1993 | Robbins, III | |
| 5,240,130 | A | 8/1993 | Osbakk | |
| 5,244,125 | A | 9/1993 | Robbins, III | |
| 5,251,820 | A | 10/1993 | Ho | |
| 5,299,700 | A | 4/1994 | Beniacar | |
| 5,328,055 | A | 7/1994 | Battle | |
| 5,337,921 | A | 8/1994 | Wilson et al. | |
| 5,370,250 | A | 12/1994 | Gilbert | |
| 5,398,846 | A | 3/1995 | Corba et al. | |
| 5,421,485 | A | 6/1995 | Furuta et al. | |
| 5,429,254 | A | 7/1995 | Christine | |
| 5,435,464 | A | 7/1995 | Alexander et al. | |
| 5,439,141 | A | 8/1995 | Clark et al. | |
| 5,464,129 | A | 11/1995 | Ho | |
| 5,472,119 | A | 12/1995 | Park et al. | |
| 5,474,212 | A | 12/1995 | Ichikawa et al. | |
| 5,478,015 | A | 12/1995 | Black | |
| 5,542,581 | A | 8/1996 | Habora et al. | |
| 5,558,257 | A | 9/1996 | Braun | |
| 5,615,791 | A | 4/1997 | Vatelot et al. | |
| 5,642,826 | A | 7/1997 | Melrose | |
| 5,706,984 | A * | 1/1998 | Tada | B05B 11/1011 222/182 |
| 5,711,445 | A | 1/1998 | Robbins, III | |
| 5,718,383 | A | 2/1998 | Smith et al. | |
| 5,836,479 | A | 11/1998 | Klima et al. | |
| 5,839,616 | A | 11/1998 | Irwin et al. | |
| 5,871,122 | A | 2/1999 | Klima et al. | |
| 5,890,624 | A | 4/1999 | Klima et al. | |
| 5,934,519 | A | 8/1999 | Kim et al. | |
| 5,944,223 | A | 8/1999 | Klima et al. | |
| 5,947,332 | A | 9/1999 | Klima, Jr. et al. | |
| 5,979,715 | A | 11/1999 | Emrick | |
| 5,984,199 | A | 11/1999 | Restive | |
| 6,027,041 | A | 2/2000 | Evans | |
| 6,059,152 | A | 5/2000 | Mayfield | |
| 6,123,230 | A | 9/2000 | Klima, Jr. et al. | |
| 6,179,142 | B1 | 1/2001 | Hansen | |
| 6,206,243 | B1 | 3/2001 | Schneider et al. | |
| 6,213,358 | B1 | 4/2001 | Libit et al. | |
| 6,250,511 | B1 | 6/2001 | Kelly | |
| 6,253,993 | B1 | 7/2001 | Lloyd et al. | |
| 6,319,453 | B1 | 11/2001 | Klima, Jr. et al. | |
| 6,345,774 | B1 | 2/2002 | Calhoun | |
| 6,394,319 | B1 | 5/2002 | Pucillo | |
| 6,409,103 | B1 | 6/2002 | Norville et al. | |
| 6,412,662 | B1 * | 7/2002 | Bryan | B05B 15/00 222/146.5 |
| 6,510,965 | B1 | 1/2003 | Decottignies et al. | |
| 6,530,108 | B1 | 3/2003 | Brown et al. | |
| 6,540,109 | B1 | 4/2003 | Klima et al. | |
| 6,631,830 | B2 | 10/2003 | Ma et al. | |
| 6,659,670 | B1 | 12/2003 | Blouse | |
| 6,732,958 | B2 | 5/2004 | Norville et al. | |
| 6,789,303 | B2 | 9/2004 | Maas et al. | |
| 6,833,072 | B1 | 12/2004 | Krestine et al. | |
| 6,834,815 | B2 | 12/2004 | Appleby | |
| 7,040,510 | B1 | 5/2006 | Hester | |
| 7,251,839 | B2 | 8/2007 | Bell | |
| 7,478,738 | B2 | 1/2009 | Hood et al. | |
| 7,513,378 | B2 | 4/2009 | Mori et al. | |
| 7,520,447 | B2 | 4/2009 | Engelen et al. | |
| 7,581,273 | B2 | 9/2009 | Dobrin et al. | |
| 7,648,083 | B2 | 1/2010 | Hornsby et al. | |
| 7,717,306 | B2 | 5/2010 | White, Sr. | |
| 8,157,131 | B2 | 4/2012 | Sim | |
| 8,215,509 | B2 | 7/2012 | Kuboi et al. | |
| 8,272,562 | B2 | 9/2012 | Ziegler | |
| 8,322,630 | B2 * | 12/2012 | Richardson | B05B 1/3436 222/340 |
| 8,322,631 | B2 * | 12/2012 | Richardson | B05B 11/1016 222/340 |
| 8,534,478 | B2 | 9/2013 | Mays, III et al. | |
| 8,833,674 | B2 * | 9/2014 | Lo | B05B 15/652 239/227 |
| 8,967,434 | B2 * | 3/2015 | Lewandowski | B05B 15/652 222/383.1 |
| 10,046,347 | B2 * | 8/2018 | Alluigi | B05B 11/1059 |
| 2001/0011661 | A1 | 8/2001 | Klima et al. | |
| 2002/0031625 | A1 | 3/2002 | Klima, Jr. et al. | |
| 2002/0070244 | A1 | 6/2002 | Simard | |
| 2003/0038186 | A1 | 2/2003 | Klima et al. | |
| 2003/0066843 | A1 | 4/2003 | Schwartz | |
| 2004/0035819 | A1 | 2/2004 | Dennison | |
| 2004/0104194 | A1 | 6/2004 | Dennison | |
| 2004/0245208 | A1 | 12/2004 | Dennison | |
| 2005/0167442 | A1 | 8/2005 | Cuisinier | |
| 2006/0143847 | A1 | 7/2006 | Vinson et al. | |
| 2006/0237485 | A1 | 10/2006 | An | |

(56) References Cited

U.S. PATENT DOCUMENTS

| | | | |
|---|---|---|---|
| 2007/0086683 | A1 | 4/2007 | Yeager |
| 2007/0215645 | A1 | 9/2007 | Clynes et al. |
| 2007/0235472 | A1 | 10/2007 | McFarland |
| 2008/0011779 | A1 | 1/2008 | Klima et al. |
| 2008/0023499 | A1 | 1/2008 | Knight |
| 2008/0279611 | A1 | 11/2008 | Graphenius |
| 2008/0315018 | A1 | 12/2008 | Withers |
| 2009/0212077 | A1 | 8/2009 | Carden |
| 2009/0277928 | A1 | 11/2009 | Bruckner |
| 2010/0096414 | A1 | 4/2010 | Dennis |
| 2010/0096415 | A1 | 4/2010 | Dennis |
| 2010/0252573 | A1 | 10/2010 | Hetmaniok et al. |
| 2011/0062185 | A1 | 3/2011 | McFarland |
| 2011/0120992 | A1 | 5/2011 | Gorman et al. |
| 2011/0121039 | A1 | 5/2011 | Dennis |
| 2011/0158740 | A1 | 6/2011 | Kandasamy et al. |
| 2011/0180101 | A1 | 7/2011 | Konishi et al. |
| 2011/0180619 | A1 | 7/2011 | Konishi et al. |
| 2011/0253813 | A1* | 10/2011 | Lo ......................... B05B 15/652 239/723 |
| 2011/0315717 | A1* | 12/2011 | Lewandowski ....... B05B 15/652 222/526 |
| 2012/0097707 | A1 | 4/2012 | Taberlet |
| 2013/0239449 | A1 | 9/2013 | Heinrichs |
| 2014/0346252 | A1 | 11/2014 | Davis |
| 2017/0266677 | A1* | 9/2017 | Alluigi ................ B05B 11/0013 |

OTHER PUBLICATIONS

Nexshift, “PIVOT | The Spray Bottle Reinvented”, Kickstarter, retrieved from internet Dec. 16, 2022, https://www.kickstarter.com/projects/pivotspray/pivot-the-spray-bottle-reinvented/description, Apr. 6, 2021, 28 pages.

* cited by examiner

SPRAY BOTTLE HAVING HINGING AND LOCKING SPRAY HEAD ASSEMBLY WITH REPLACEABLE COMPONENTS, AND MULTI-LABEL SYSTEMS

TECHNICAL FIELD

This disclosure relates generally to janitorial-related products and services, and more particularly to spray bottle systems having hinging handle and spray head assemblies, serviceable or replaceable pump function components and a multi-label system.

BACKGROUND

A typical conventional spray bottle, used for dispensing liquids by trigger action by a user, may include a spray head that is rigidly attached to a bottle containing a solution. The spray head is typically mounted on a vertically extending neck. The spray head is typically directed to spray a solution along an axis perpendicular with a vertical bottle situated below the spray head. Such an arrangement reasonably serves when the intended target is easily reached by a horizontal spray trajectory. However, the vertical height of a rigidly upstanding neck can prevent such a bottle from being used and stored in small spaces. Furthermore, in the event that an intended target is not easily reached by a horizontal spray trajectory, tilting of the bottle can cause the lower end of an internal liquid-drawing tube to rise above the solution in the reservoir, particularly as the solution is low in quantity. When the reservoir is full, not only might solution escape from the junction of the neck of the bottle and spray head if the bottle is tilted, other problems can arise as stress is caused in the wrist of the user in supporting a full reservoir in a raised cantilever fashion fatiguing both the forearm and trigger finger muscles and tendons.

Current spray bottles for cleaning and such are typically one-time-use items with regard to the use and depletion of the original contents of the purchased bottle. They are not necessarily intended for multiple refills and don't have service facilitating features.

SUMMARY

This summary is provided to introduce, in a simplified form, concepts that are further described in the following detailed descriptions. This summary is not intended to identify key features or essential features of the claimed subject matter, nor is it to be construed as limiting the scope of the claimed subject matter.

In at least one embodiment, a spray bottle assembly includes: a bottle for containing a liquid, the bottle having a neck; and a spray head assembly having a base cap configured to removably attach to the neck of the bottle, and a spray head pivotally attached to the base cap, the base cap including at least one feature that rotationally locks the base cap relative to the neck of the bottle to constrain the spray head to pivoting in a predetermined vertical plane. The base cap includes an insert for placement in the neck of the bottle, and the at least one feature that rotationally locks the base cap includes at least one notch in the insert. The neck of the bottle includes an interior protrusion received in the notch. The spray bottle assembly further includes a collar that secures the base cap to the neck of the bottle by rotating the collar relative to the neck of the bottle. The protrusion received in the notch prevents the base cap from rotating relative to the neck of the bottle when the collar is rotated and thereby tightened.

The spray head assembly may include a handle to which the spray head is connected, the handle pivotally attached to the base cap by a hinge that permits pivoting of the handle and spray head in the predetermined vertical plane.

The hinge may permit the spray head assembly to pivot to a stowed position for carrying or compact storage.

The spray head and the bottle may interact to include a security protrusion configured to lock the spray head assembly in the stowed position.

The security protrusion may be mounted on a rotatable nozzle, the rotation of which locks and unlocks the spray head assembly at the stowed position by respectively positioning and removing the security protrusion from a groove defined by the bottle.

The spray head assembly may include a nozzle and an operable trigger, and actuation of the trigger causes dispensation of solution from the bottle through the nozzle.

The trigger may be compressed side to side to make it easily removable.

The spray head assembly may include a spinner rotationally driven by fluid flow as the solution is dispensed, wherein the spinner facilitates an angularly even distribution of solution through the nozzle.

A spinner carrier that receives the spinner such that it seals, wherein the combination of the spinner and spinner carrier are housed within a pivoting assembly that allows the spinner carrier assembly to be easily removed.

A pumping mechanism may include: a unibody plunger having a sleeve section that variably inverts and overlaps, as the trigger is actuated, an end thereof thus defining an internal volume that varies with the disposition of the sleeve section relative to the end.

The spray head may hinge open for servicing.

The spray head may include a pivoting assembly that hinges away from the rearward end thereof, carrying a trigger and nozzle with the forward end permitting removal, servicing, or replacement of a spinner from the forward section when the spray head is hinged open.

In at least one embodiment, a multi-label system for a spray bottle, the multi-label system including: at least one strip, the strip including multiple connected labels, each label including a ring for positioning on a neck of the spray bottle, each ring including at least one feature that rotationally locks the label thereof relative to the neck of the bottle, wherein the strip has preformed bends for folding, and wherein the strip has printed information on both of two sides thereof. The at least one feature that rotationally locks the label may be one of male and female, and the neck of the bottle may have a corresponding feature that engages the at least one feature, and wherein the corresponding feature may be the other of male and female.

A flap may be attached to each ring within the system by the preformed bend.

The strip may be folded in such a way as to present only a chosen label as visible when positioned on the neck of the spray bottle.

The flap may include information relating to contents that the user has chosen to use in the spray bottle.

The at least one feature captures the folded flap of the label such that it is presented in a vertical plane.

The at least one feature that rotationally locks the label includes a tab extending inward from the ring to be received in a recess in the neck of the bottle.

At least one label of the multiple labels may include a QR code that provides access to detailed information.

Multiple QR codes located on each individual label within the multi-label system may provide use and safety information that represents the type of chemical contained in the bottle, as chosen by the user.

Multiple electronic markings, such as bar codes, located on each individual label within the multi-label system may provide coded information that may be read by an automated mixing and filling machine, thereby dispensing a proper mix and amount of chemical when the label system, attached to the bottle is placed in proximity to the machine sensor.

Each individual label within the system may be color coded with specific colors indicating predetermined types of chemical for casual and instantaneous recognition of the contents.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
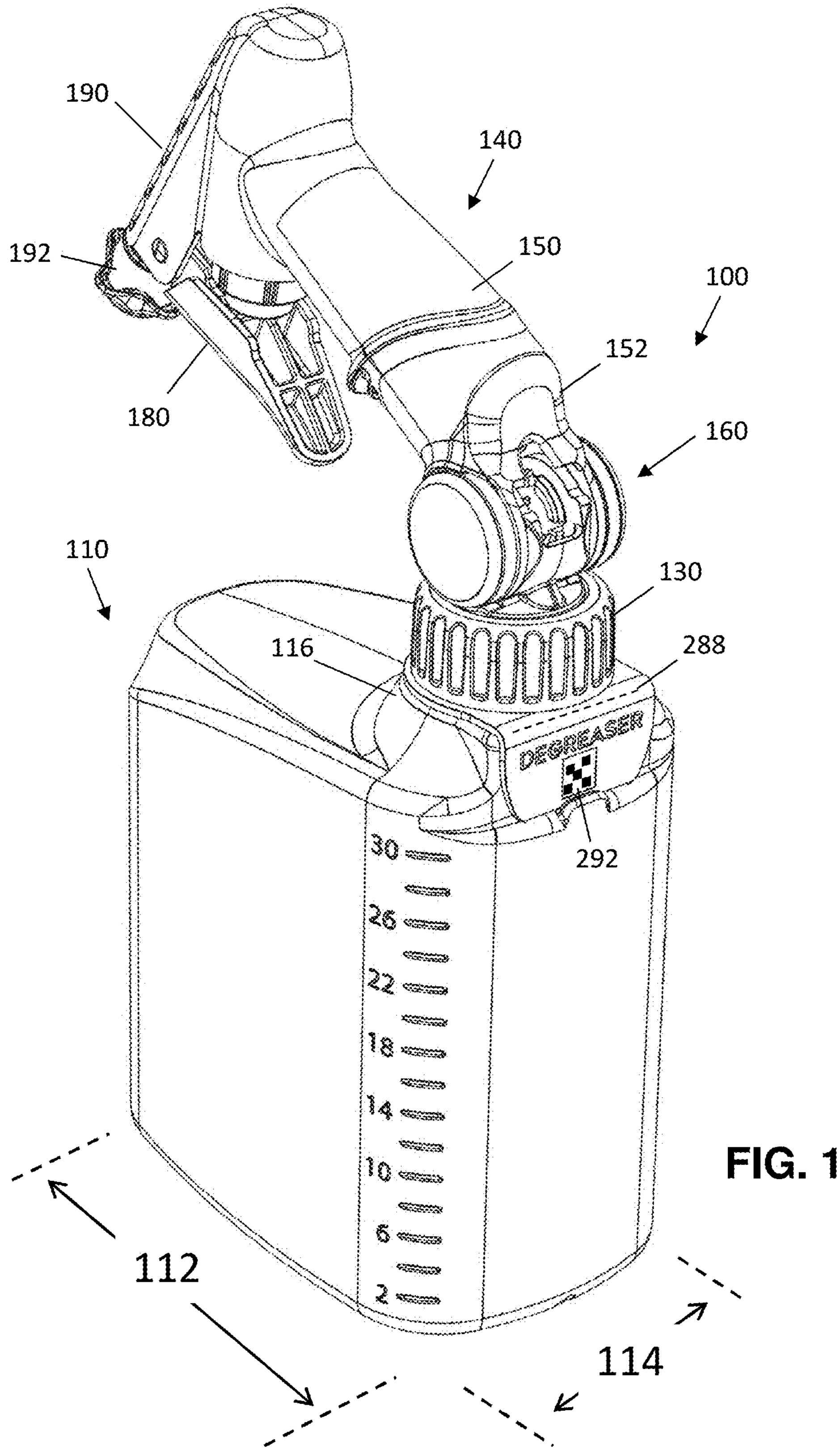
FIG. 1 is a perspective view of a spray bottle assembly, according to at least one embodiment, shown with the handle and spray head thereof hinged partially forward end downward.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments. Unless defined otherwise, all technical and scientific terms used herein have the same meaning as commonly understood to one of ordinary skill in the art to which the presently disclosed subject matter pertains.

FIG. 1 is a perspective view of an improved spray bottle assembly 100 according to at least one embodiment. The spray bottle assembly 100 includes a bottle 110 in which a solution is contained in use. The bottle 110 is shown as having a greater length 112 than width 114 and as having an upper neck 116 (FIG. 4) having external threads that engage the internal threads of a collar 130.

A spray head assembly 140 is mounted on the top of the bottle 110. The spray head assembly has a base cap 142, which caps the bottle 110. The base cap 142 has a lower portion referenced as an insert 144 (FIG. 4) that slips partially into the neck 116 of the bottle 110 upon assembly, for example after refilling the bottle with a solution. A flange 146 around the insert 144 is captured between the upper end of the neck 116 and the collar 130, and the collar is tightened to securely mount the spray head assembly 140 on the bottle 110. An O-ring 138 or other gasket may be trapped between the flange 144 and neck 116 to assure a seal. The insert 144 may be shaped as a tapered cylinder with notches 148 that receive corresponding inwardly directed protrusions 134 within the neck 116 of the bottle 110 as the insert 144 is positioned. This rotationally locks the base cap 142 of the spray head assembly 140 from rotating as the collar 130 is tightened and thus assures that the hinging action of the spray head assembly 140 is constrained to the intended plane over the bottle and not laterally directed.

Figure 2:
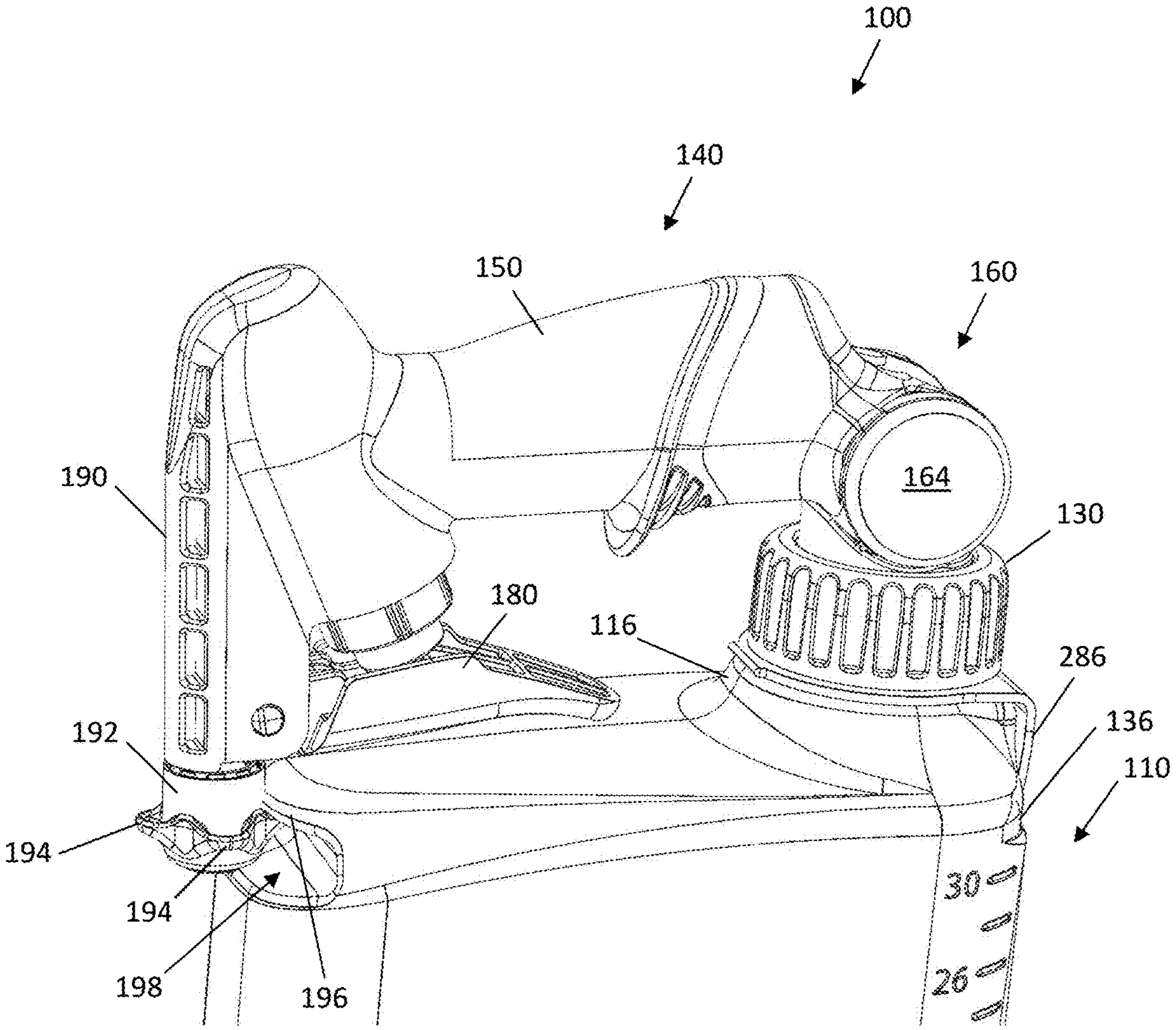
FIG. 2 is a perspective view of a top portion of the spray bottle assembly of FIG. 1, shown with the handle and spray head hinged fully downward and locked.

The spray head assembly 140 has a handle 150, a trigger 180, and a spray head 190 mounted on the handle. Upon user action on the trigger 180, a pumping mechanism within the spray head 190 is actuated, which draws solution through a tubular conduit path from the interior of the bottle 110 and squirts the solution from a forward nozzle 192. The trajectory of the dispensed solution varies with the pivot position of the handle 150, which is mounted on the base cap 142 portion of the spray head assembly 140 by an intermediate hinge 160 (FIGS. 1-2).

Figure 3:
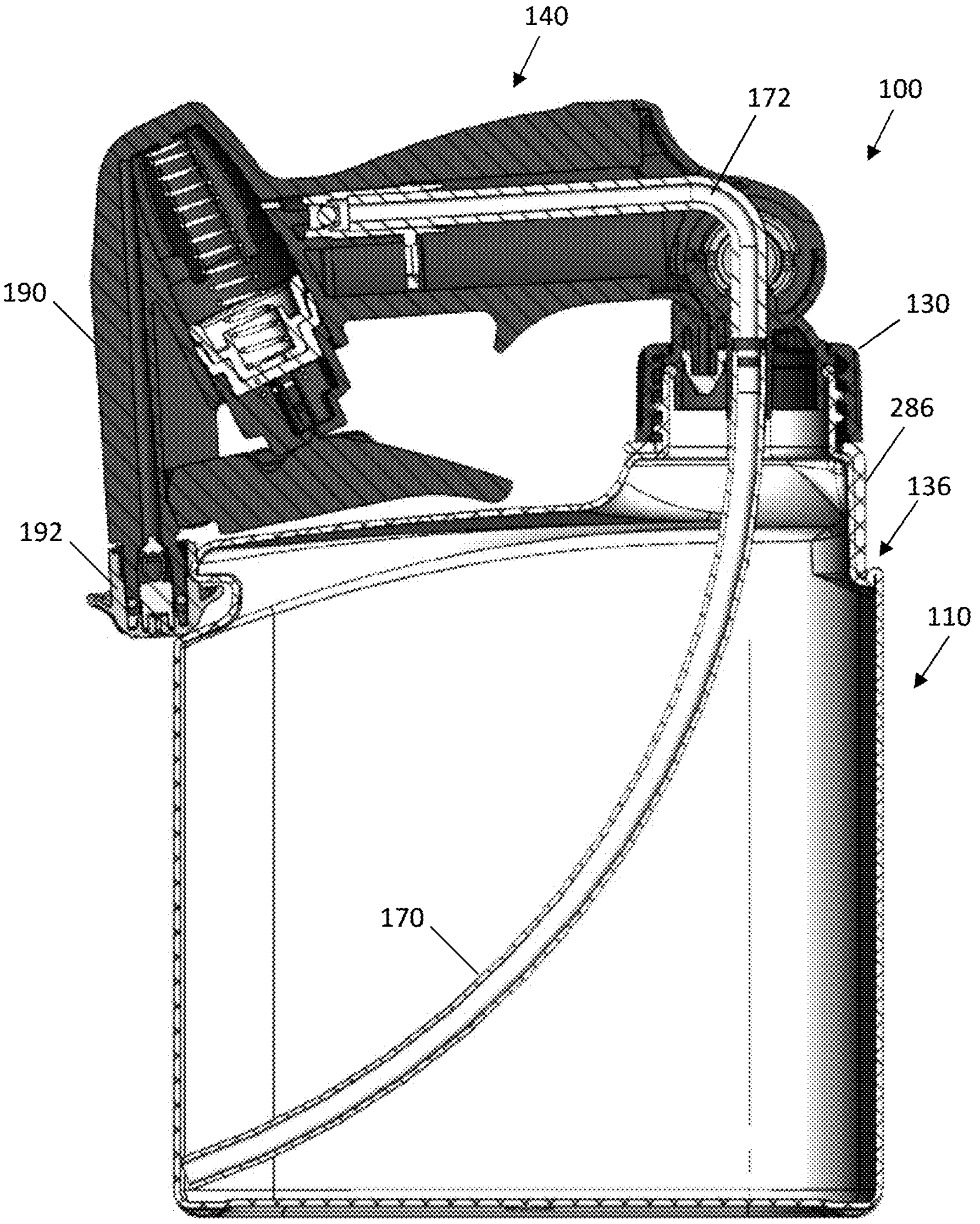
FIG. 3 is a cross-sectioned view of the spray bottle assembly of FIG. 1 taken approximately along a vertical mid plane about which the spray bottle assembly is approximately symmetric.

In FIG. 1, the hinge-mounted handle 150 is shown rotated partially forward end downward, below a horizontal axis. In FIGS. 2 and 3, the handle 150 is hinged fully downward with the spray head 190 locked in a lowest and stowed position. As shown in FIG. 1, the spray head assembly 140 extends centrally from the top of the bottle with respect to the width 114. The spray head assembly 140 extends from the rear end of the top of the bottle 110 with respect to the length 112. By this advantageous arrangement, hinging the spray head assembly 140 forward toward the bottle 110 places the handle 150 and spray head 190 approximately over the top of the bottle, conserving both vertical and horizontal space. For example, in the configuration of FIGS. 2 and 3, the spray bottle assembly 100 requires minimal shelf space and vertical accommodation when not in use.

The lower center of gravity derived from the spray head resting in a much lower position than traditional sprayers, makes it much more stable than traditional sprayers when empty.

The elongated cantilevered form of the bottle causes the bottle to rotate such that the bottom of the fill tube is always located at the lowermost part of the bottle volume, thereby funneling all fluid towards the end of the fill tube no matter the angled orientation of the spray head.

The shorter form factor of the stored configuration is much more space efficient, saving transportation and storage costs.

The forward nozzle 192 is rotatable to vary the shape of discharged fluid flow from a widely dispersed cone or other pattern to a concentrated stream. The nozzle has multiple outwardly extending security clips 194 by which the nozzle 192 engages the forward end of the bottle. In the lowered and locked position of the handle 150, a clip 194 can engage an overhang 196 (FIG. 2) extending forward from the top of bottle 110. The multiple clips 194 of the nozzle 192 advantageously permit the locking of the spray head assembly 140 in multiple rotational positions of the nozzle 192, as any one of the clips 194 can be rotated or snapped into the groove 198 defined below the overhang 196, locking the spray head assembly 140 into its stowed position for carrying or compact storage. Upon rotation of the nozzle, or flexing of the spray head, the engaged clip 194 exits the groove 198 and disengages the overhang 196, releasing the spray head assembly 140 to be raised for use. In the stowed position of FIG. 2, the trigger 180 is inaccessible such that accidental discharge is prevented. As such, the clips 194 constitute a child lock system preventing use of the spray bottle assembly 100 by a child when the spray head assembly 140 is locked into its stowed position.

Figure 4:
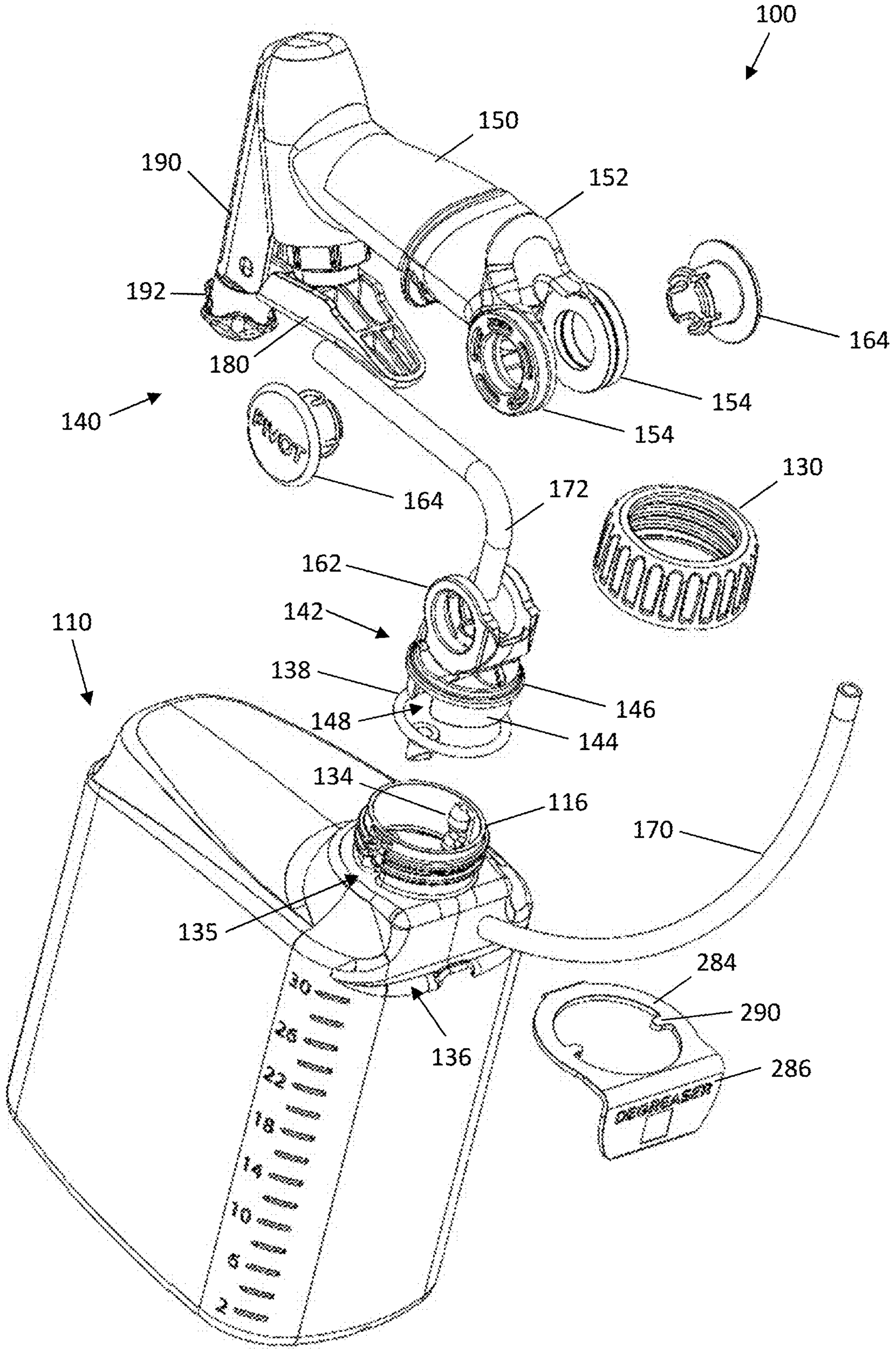
FIG. 4 is an exploded perspective view of the spray bottle assembly of FIG. 1.

FIG. 3 shows the spray bottle assembly 100 cross sectioned approximately along a vertical mid plane about which the spray bottle assembly is approximately symmetric. FIG. 4 is an exploded view of the spray bottle assembly 100 in which the components of the hinge 160 (FIGS. 1-2) that joins the proximal end 152 of the handle 150 with the upper end of the base cap 142 (FIG. 4) are shown. A pair of laterally spaced annuli 154 extending from the proximal end 152 of the handle 150 align with a mount 162 on the base cap 142 opposite the insert 144. Laterally inserted hinge caps 164 maintain a hinged engagement of the annuli 154 and mount 162 thereby pivotally attaching the handle 150 to the base cap 142.

A tubular conduit path for conveying solution from the bottle to the spray head 190 is defined by a siphon tube 170 (FIGS. 3-4) carried by and within the bottle 110, and an upper tube 172 carried by the spray head assembly 140, which are joined at the base cap 142. The junction is maintained as the spray head assembly is pivoted into various in-use positions.

Figure 5:
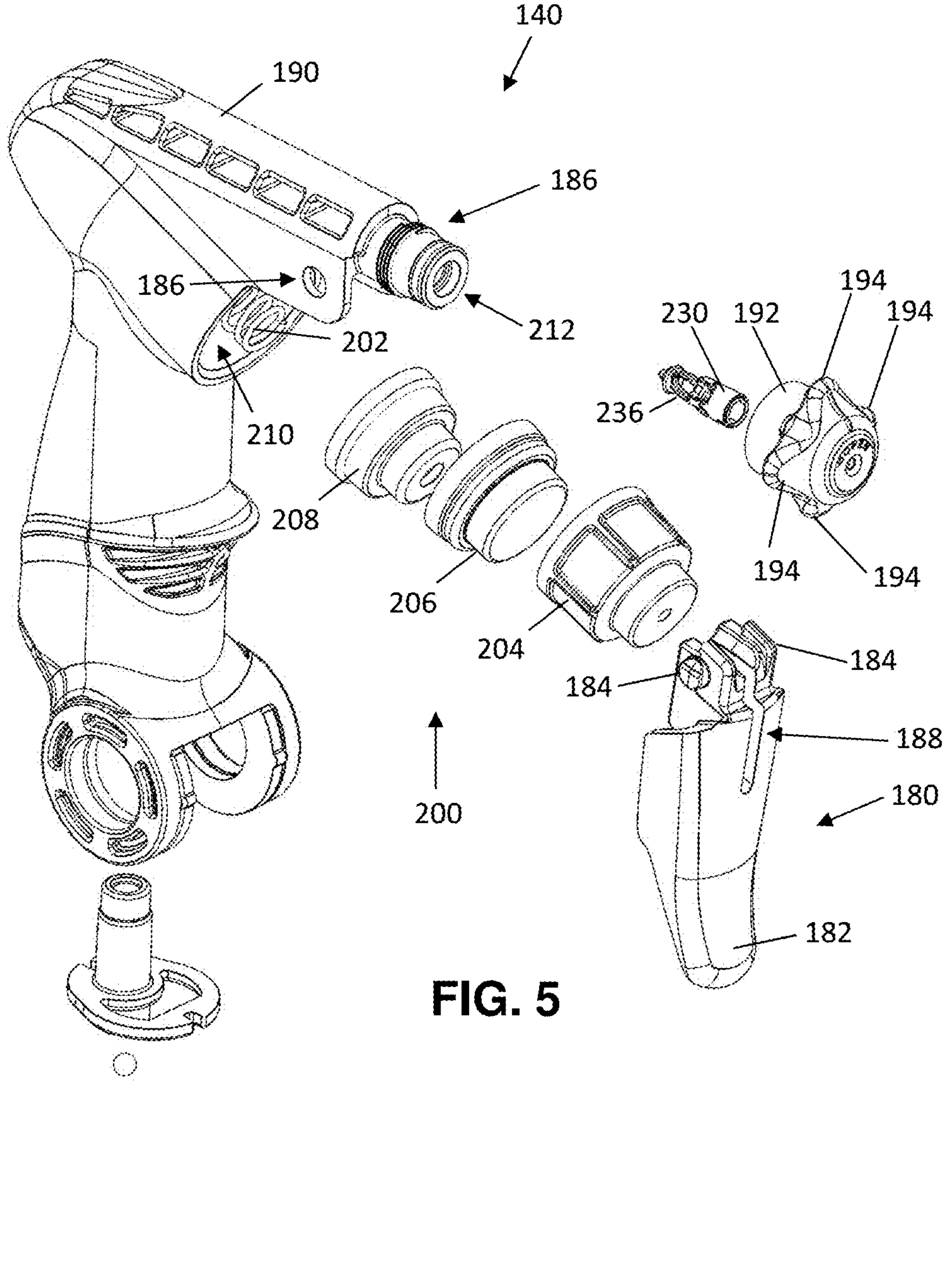
FIG. 5 is an exploded perspective view of the spray head assembly according to FIG. 1.

FIG. 5 is an exploded perspective view of the spray head assembly 140 according to at least one embodiment. The spray head 190 is fixedly attached to the distal end of the handle. The trigger 180 has a lever end 182 and an opposite proximal end from which posts 184 extend laterally. The posts 184 are received by mounting holes 186 in the forward end of the spray head 190 to pivotally mount the trigger 180 to the spray head. The lever end 182 has beveled edges for comfort when a user presses the trigger, for example by use of an index finger. The trigger has an easy release feature in that the posts 184 are ramped to ease the mounting of the trigger 180 on spray head 190, and dismounting therefrom, for replacement or servicing of the trigger or other components.

The proximal end of the trigger 180 has a slot 188 between the posts 184, permitting the proximal end of the trigger to be squeezed laterally, compressed side to side, for example by hand. This narrows the slot and permits the posts 184 to enter or exit the mounting holes 186. The trigger 180 is shown compressed for example in FIGS. 7 and 11. This permits the trigger 180 and pumping mechanism 200 to be removed, to be serviced or replaced in whole or in part, and returned for use. Release of the laterally squeezing force on the sides of the trigger permit the slot 188 to re-expand and thus pivotally mount the trigger 180 by way of the posts 184 in the mounting holes 186. The easy removal of the trigger permits access by the user to the piston for easy replacement and refurbishment of worn units.

The pumping mechanism 200, in the embodiment of FIG. 5, has a trigger-return spring 202, a rigid piston 204, a flexible piston seal 206, and piston backer 208. The piston seal 206 acts to seal with the surrounding cylindrical inner wall of the housing 210. The rigid piston 204 carries the piston seal 206 and provides a rigid part to provide rigid stability against the trigger pull. The piston backer 208 holds the piston seal 206 against the cylinder wall, particularly when the piston is returning to its resting position, so that it doesn't draw air past the seal. When a user presses the trigger 180, the trigger presses the rigid piston 204 into housing 210 of the mechanism 200, which forces the rigid piston 206 and piston seal 208 toward the rear wall of the housing 210 thereby pumping solution into a conduit 212 toward the nozzle 192.

Within the nozzle 192, a spinner 230 is rotationally driven by the fluid flow and regularizes the flow rate as the solution is expelled. The spinner 230, for example, facilitates an angularly even distribution of sprayed solution when a widely dispersed cone or other pattern is selected for fluid spray by user-selected rotational position of the nozzle. The rearward end of the nozzle has internal threads that engage external threads of the forward end of the spray head 190. The nozzle 192 and spinner 230 can be removed by unscrewing the nozzle from the spray head in the embodiment of FIG. 5. The nozzle 192 can be easily removed, replaced, or serviced. Multiple nozzle options may be available for various spray pattern options.

The forward end of the spinner 230 has offset vents through which solution traveling along the conduit passes to reach the nozzle 192. The flows through the vents cause the fluid passing through the spinner 230 to rotate around the axis of travel of the solution within the conduit 212. The rearward end of the spinner has a loop 236 that provides spring force to seal the rearward end of the spinner to an adjacent surface within the receptacle that receives the spinner, thereby sealing the outlet and preventing the intake of air into the system when the trigger is released.

Figure 6A:
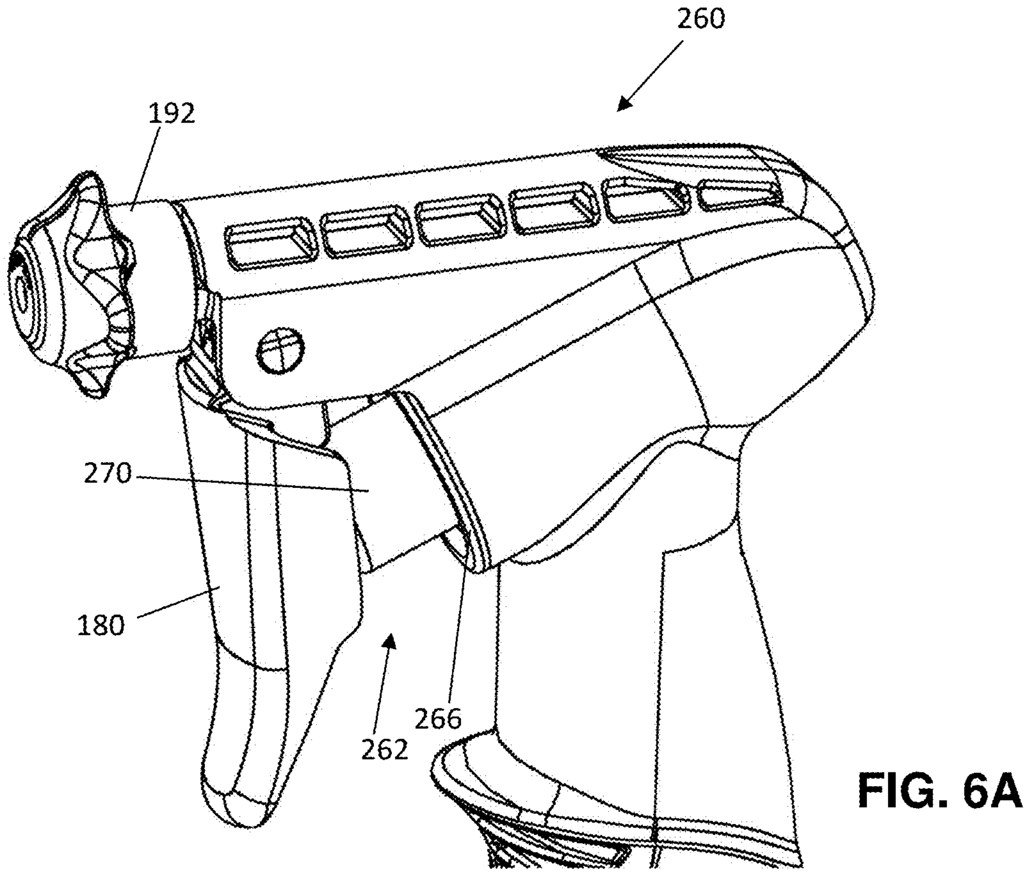
FIG. 6A is a perspective view of a spray head and pumping mechanism, according to another embodiment, having a flexible unibody plunger, shown in a solution-loaded position before actuation.
Figure 6B:
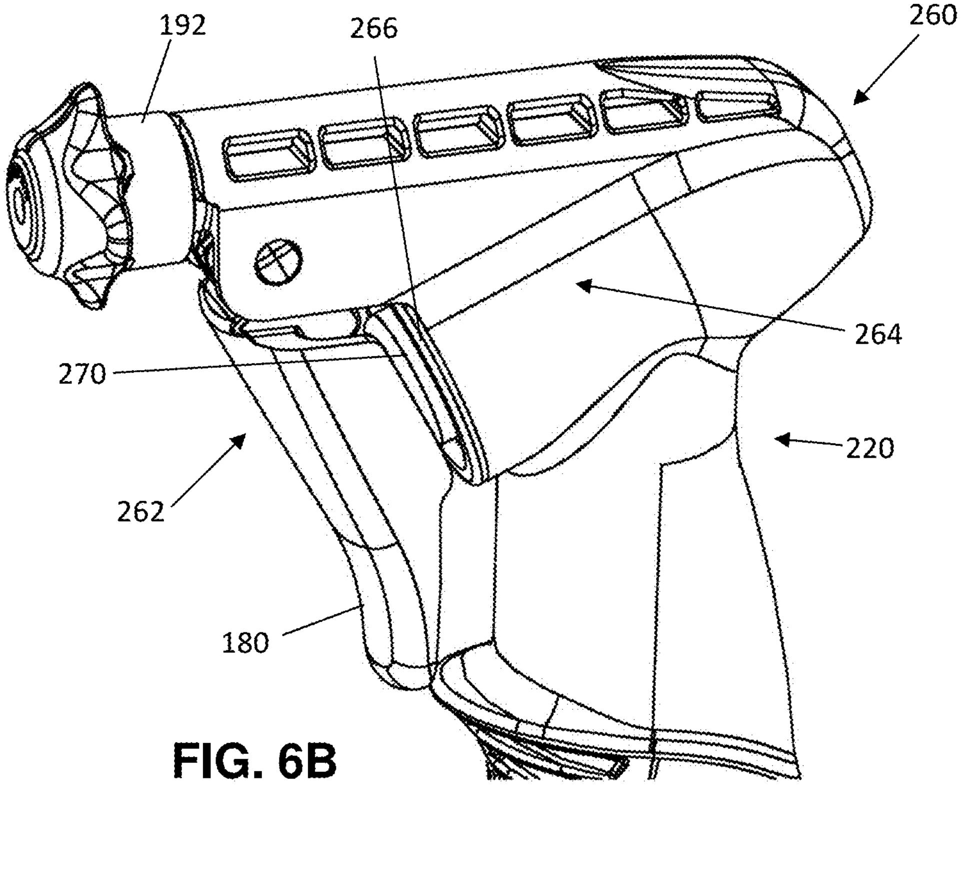
FIG. 6B shows the spray head and pumping mechanism of FIG. 6A after pressing of the trigger and actuation of the mechanism thereby dispensing the solution.

FIGS. 6A and 6B show a spray head 260 with a pumping mechanism 262 according to an alternative embodiment. The illustrated embodiment includes a flexible unibody plunger 264, shown in a solution-loaded position before actuation in FIG. 6A and FIG. 6C; and, in FIG. 6B and FIG. 6D, after pressing of the trigger 180 and actuation of the mechanism thereby dispensing the solution. The plunger 264 can be termed as unibody in that it can be formed as a one-piece item of flexible contiguous material, for example as a molded elastomeric item. The unibody plunger 264 can be described as a pistonless pressure element. The unibody plunger has a rear sleeve section 266 that variably inverts and overlaps the forward end 268 thereof thus defining an internal volume that varies with the disposition of the sleeve relative to the forward end. The unibody plunger 264 is captured within the housing of the spray head by a support cap 270. The inversion of the unibody plunger 264 ensures a consistent resistance force may be applied throughout a full stroke of the trigger. The unibody plunger can be made of, as non-limiting examples, silicone or other polymer.

A one-way ball seal 220 permits filling of the housing 210 as the trigger-return spring 202 returns the trigger to the un-pressed position, readying the pumping mechanism for a next pumping cycle by pressing of the trigger again. The ball seal 220 prevents back flow of the solution within the housing back toward the bottle. The pumped solution enters the inner spray head conduit 212 from the rear of the housing 210 and travels forward toward the nozzle 192.

Figure 6C:
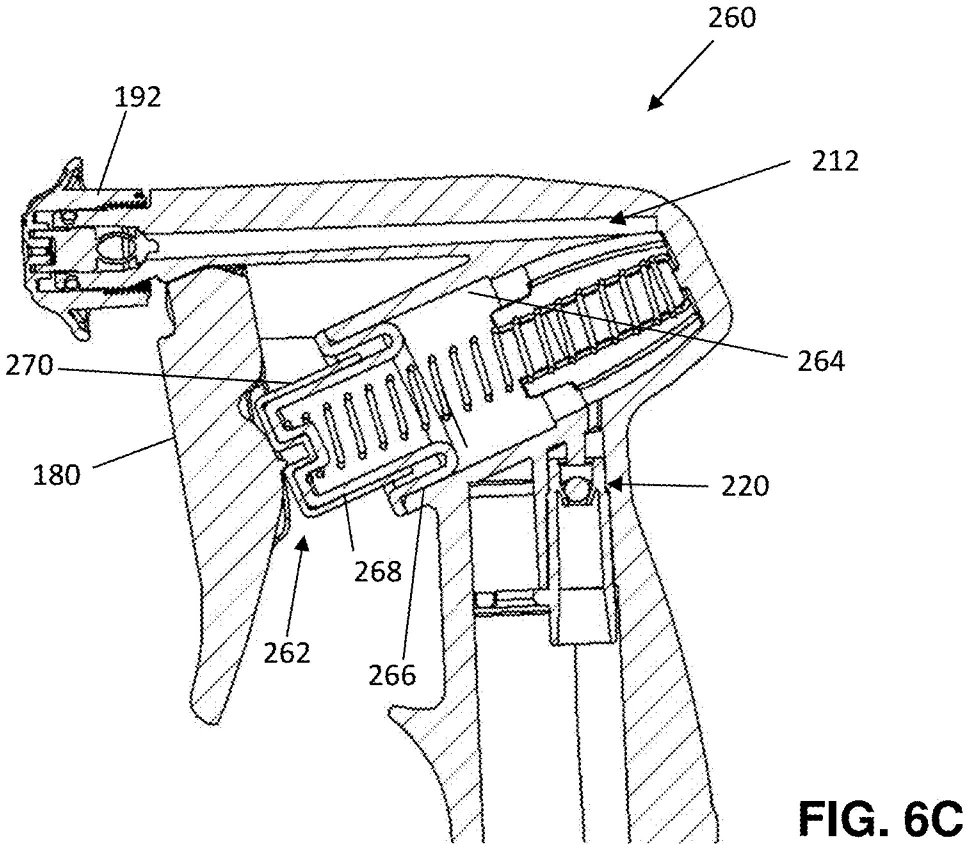
FIG. 6C is a cross section view of the spray head and pumping mechanism as in FIG. 6A.
Figure 6D:
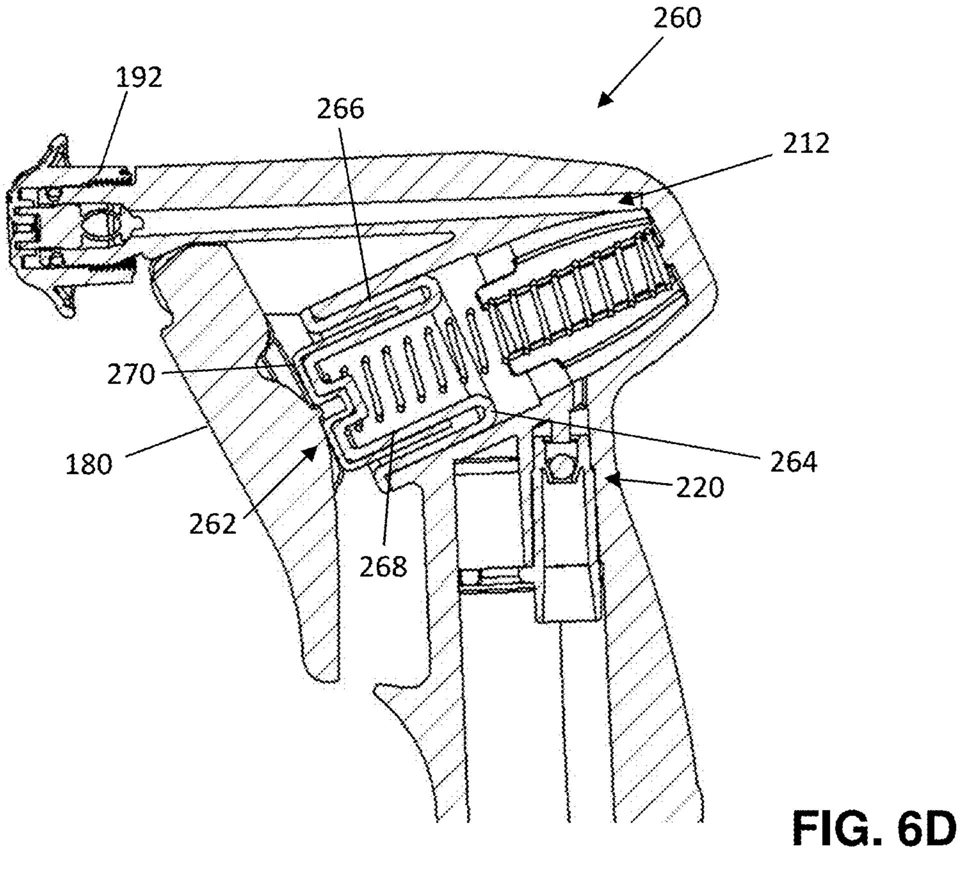
FIG. 6D is a cross section view of the spray head and pumping mechanism as in FIG. 6B.

When a user presses the trigger 180, transitioning the mechanism 262 from FIG. 6C to FIG. 6D, the trigger presses the support cap 270 into the housing of the mechanism, which forces the unibody plunger 264 to further invert, increasing the overlap of the sleeve section 266 around the forward end 268, decreasing the defined internal volume, thereby pumping solution into the conduit 212 toward the nozzle 192. As the trigger-return spring returns the trigger to the un-pressed position, the overlap of the sleeve section 266 decreases around the forward end 268, increasing the defined internal volume, drawing solution into the housing via the one-way ball seal 220 and readying the pumping mechanism for a next pumping cycle by pressing of the trigger again as already described with reference to other drawings. This method provides for changing the internal volume without high tolerance fitting of piston to cylinder or risk of wear, material degradation, or deformation of sealing surfaces.

Figure 7:
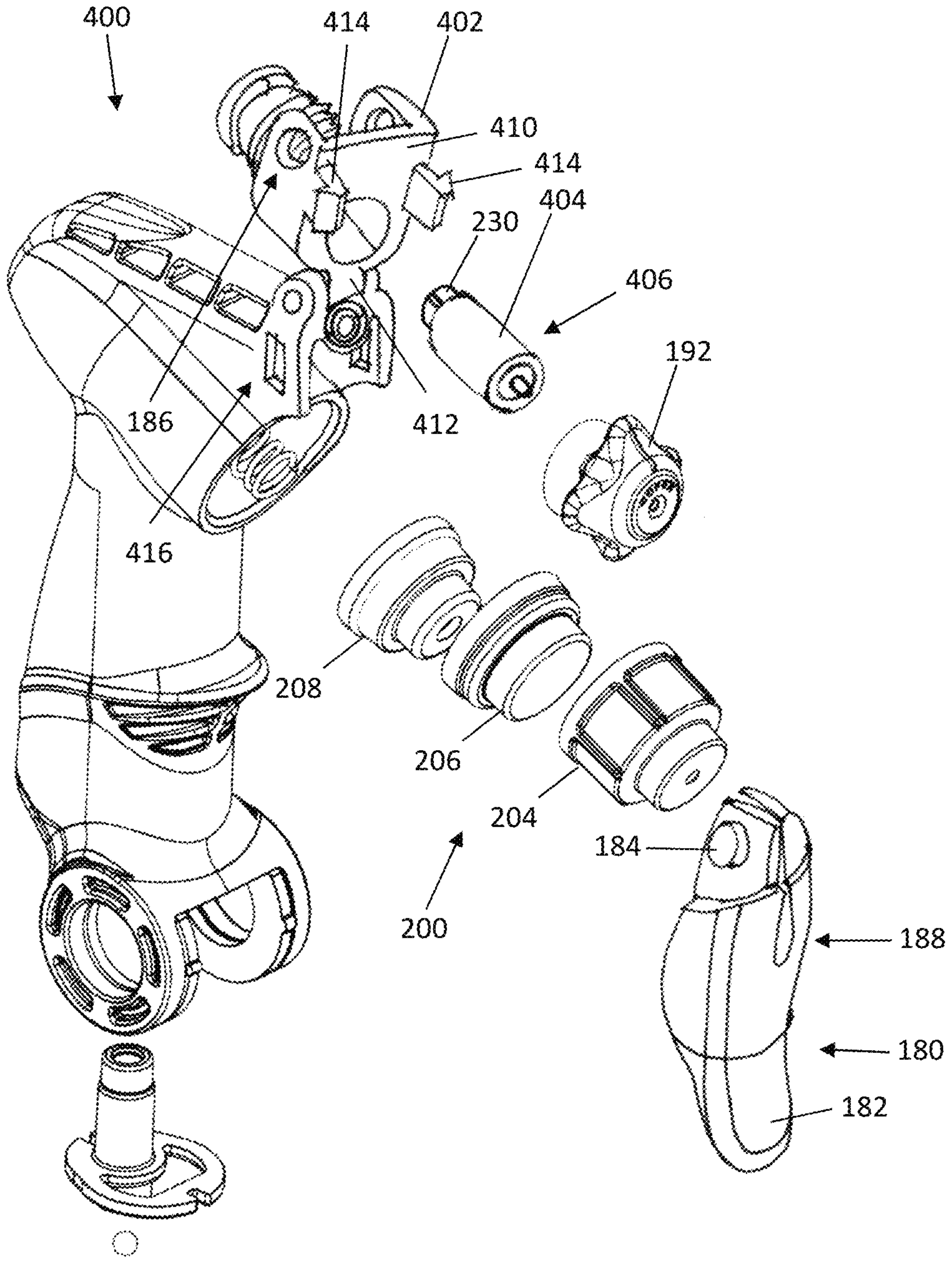
FIG. 7 is an exploded perspective view of a spray head assembly, according to at least one embodiment, with a pivoting assembly thereof pivoted to an open position.
Figure 8:
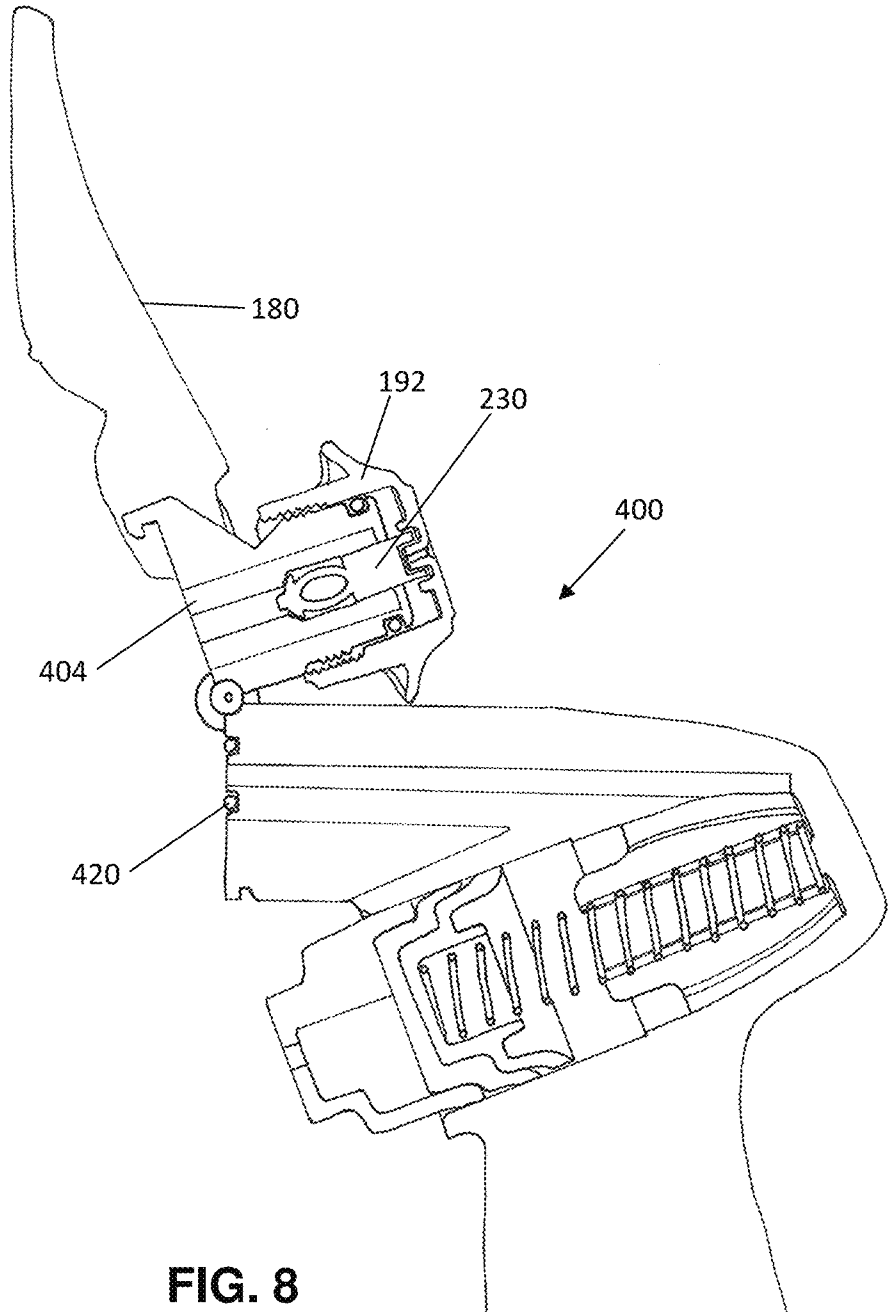
FIG. 8 is a cross sectional view of the spray head assembly of FIG. 7, assembled with the pivoting assembly pivoted to an open position for access to the spinner carrier assembly.
Figure 9:
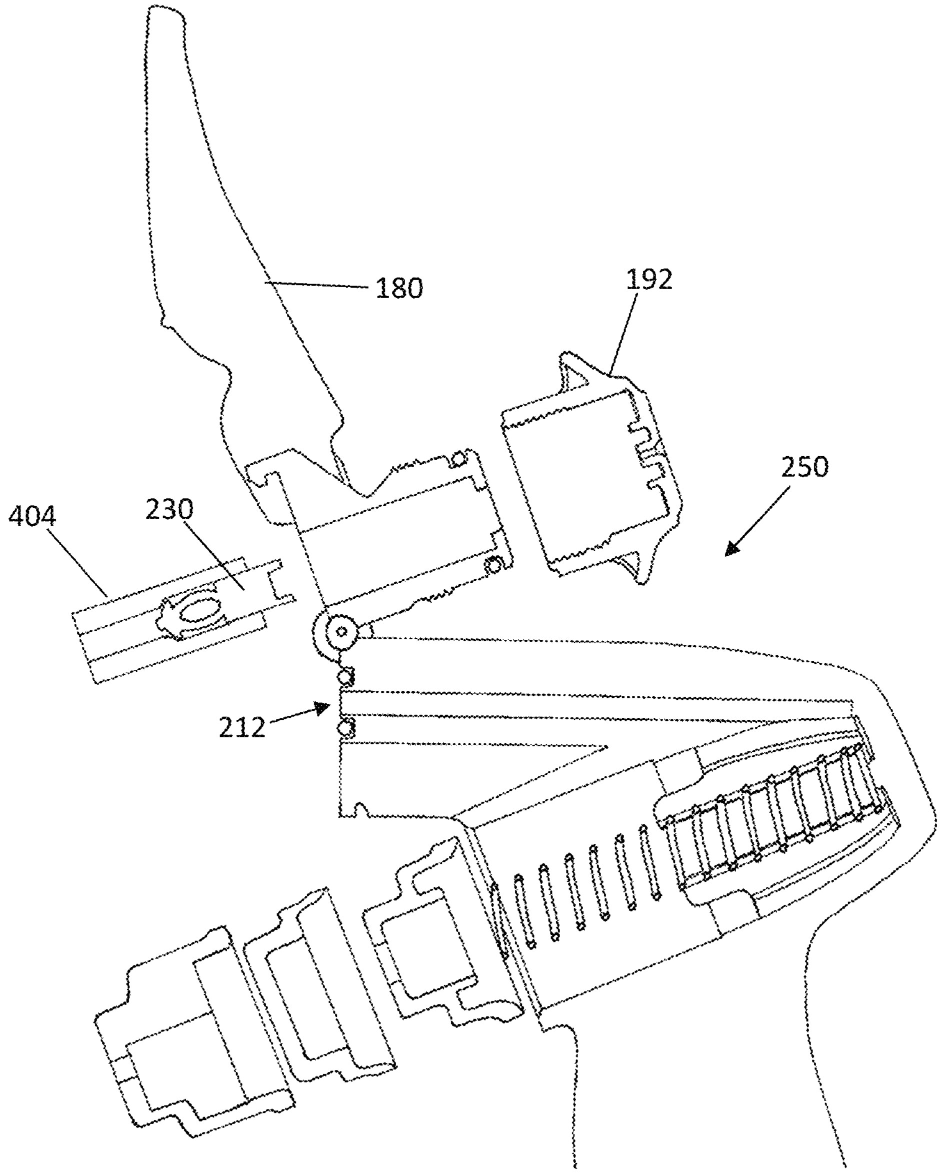
FIG. 9 is a cross sectional exploded view of the spray head assembly as in FIG. 8.

FIGS. 7-9 illustrate a spray head 400, according to another embodiment, having a pivoting assembly 402 that hinges away from the rearward end of the spray head, carrying the trigger 180, spinner carrier 404, spinner 230 and nozzle 192. The spinner carrier 404 receives the spinner 230 such that it seals. The combination of the spinner 230 and spinner carrier 404, referenced as the spinner carrier assembly 406, are housed within the pivoting assembly 402 that allows the spinner carrier assembly 406 to be easily removed and replaced. The sealed fit of the spinner 230 to the spinner carrier 404 is a precision fit that is critical to spray function. It is advantageous, therefore to replace them as a fitted pair versus precise consumer replacement of a spinner 230 alone.

The pivoting assembly 402 hinges open permitting removal, servicing, and/or replacement of the spinner 230 and spinner carrier 404 through the breach when the spray head is hinged open as in FIG. 8. The nozzle 192 can be unscrewed from the forward end of the pivoting assembly as in FIG. 9. Components of the pump mechanism can be conveniently replaced or serviced with the pivoting assembly hinged open. The pivoting assembly has a base 410 pivotally connected by a hinge 412 to the forward end of the spray head 400, and a pair of hooks 414 at lateral sides of the base to snap into engagement into corresponding slots 416 of the spray head, thereby latching the pivoting assembly in the closed position. An O-ring 420 in a circular recess in the front face of the spray head 400 seals with the pivoting assembly when in the closed position.

Figure 10A:
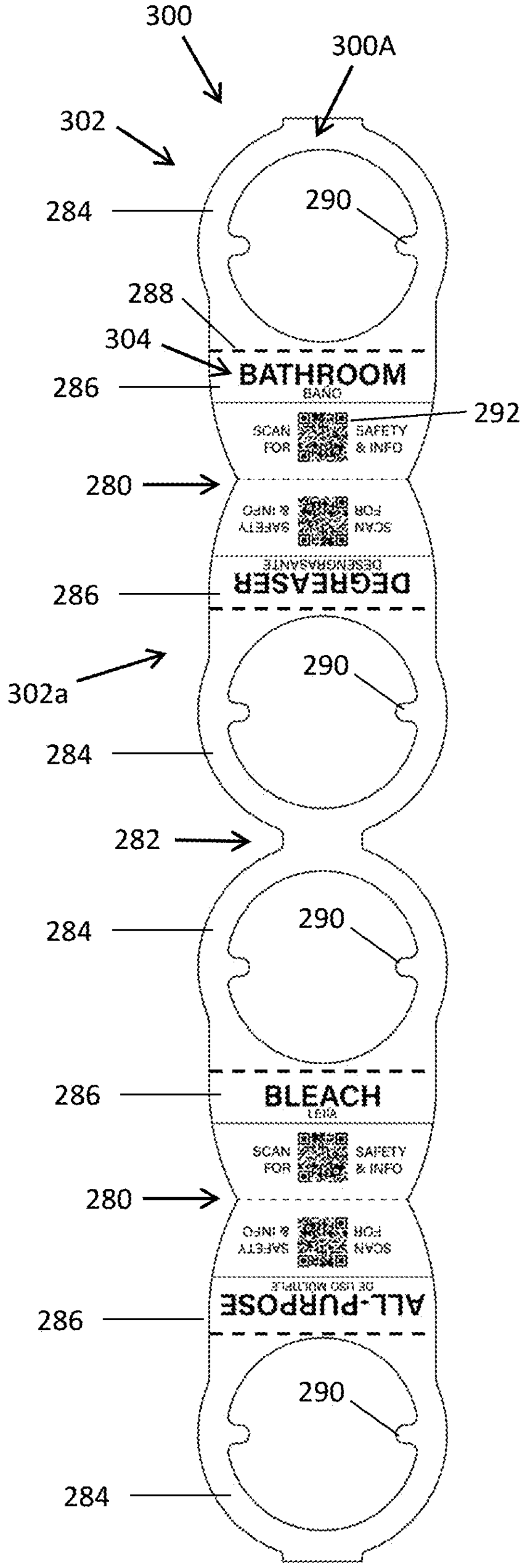
FIG. 10A shows a first side of a multi-label strip for use, as a non-limiting example, with the above referenced embodiments of spray bottle assemblies or other spray bottles.
Figure 10B:
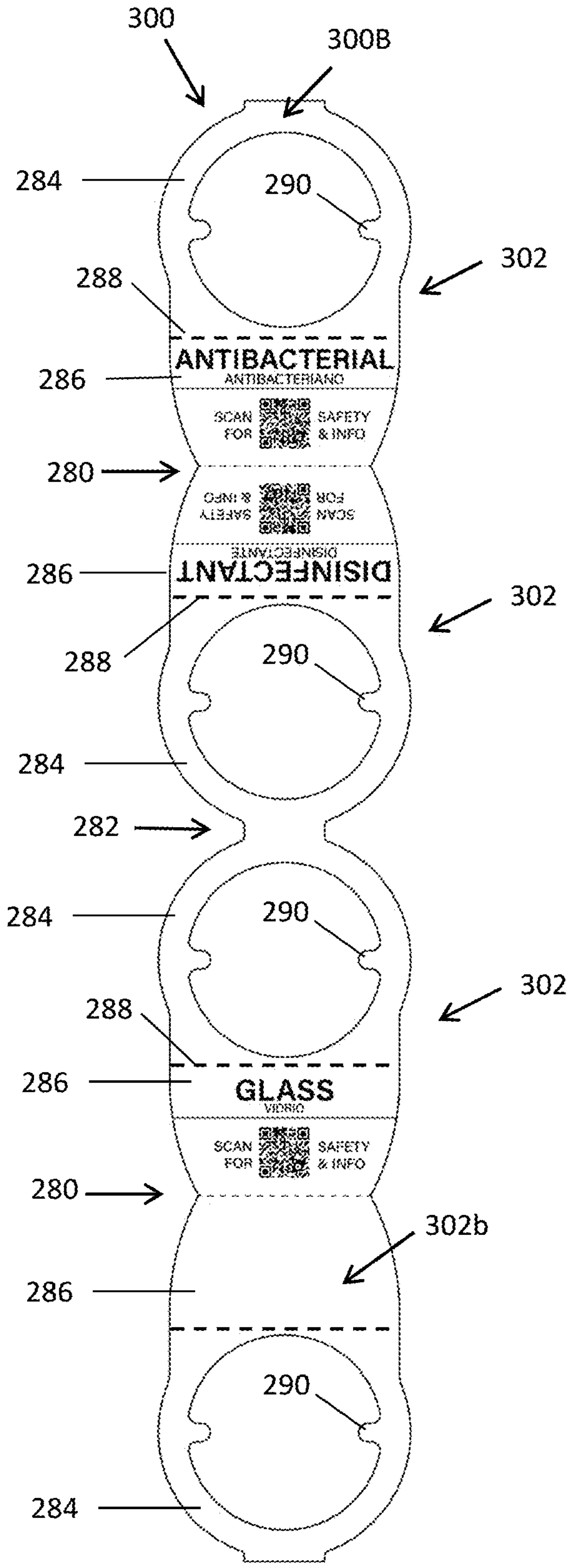
FIG. 10B shows a second side of the multi-label strip of FIG. 10A.
Figure 10C:
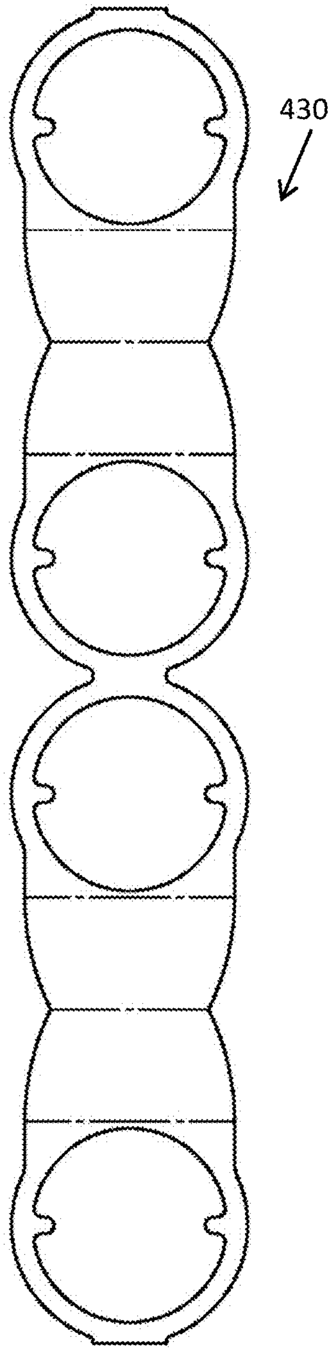
FIG. 10C is a plan view of a multi-label strip, according to at least one embodiment, shown without text or graphical indicia.

FIGS. 10A and 10B show elements of a multi-label system for use, as a non-limiting example, with the above described embodiments of spray bottle assemblies and other spray bottles as well. A label strip 300, in the illustrated embodiment, has two sides referenced nominally and respectively as a first side 300A in FIG. 10A, and second side 300A (FIG. 10B) opposite the first side. In the illustrated embodiments, each side (300A, 300B) of the strip 300 includes four labels 302, any one of which can be selected for display by a user. The two sides 300A and 300B thus provide the user with eight labels from which to choose in the illustrated embodiment. A user can selectively fold the strip 300 to display a chosen label and mount the folded strip on the neck 116 of a bottle 110. Alternatively, a user can also separate a selected label from a strip and mount just the label on the neck of the bottle. In each strip, adjacent labels are connected by lines 280 or cusps 282. The lines 280 can be engineered lines of weakness or intended fold or separation lines, which may be perforated or thinned. The cusps 282 are the junctions of tangentially connected neck rings 284.

Each label includes a neck ring 284 and a presentation flap 286. A preformed bend or fold line 288 is defined between each ring 284 and flap 286 to better present the flap when the label is mounted as shown in FIG. 1, in which the example label 302*a* is particularly illustrated. Each neck ring has inward extending tabs 290 that are received by corresponding respective recesses 135 defined by the exterior of the neck 116 of the bottle 110 (see FIG. 4) as the ring is positioned onto the neck. This rotationally locks the label from rotating as the collar 130 is placed and tightened on the neck, capturing the neck ring 284 between the top of the bottle 110 and collar 130. This assures that the presentation flap 286 is maintained at a viewable position, which is rearwardly directed with respect to the general direction of the spray head 190, in the illustrated embodiment of FIG. 1. Each presentation flap 286, as some are illustrated, may include respective text and/or graphical indicia for viewing by a user so as to provide information of the current contents of the bottle. Each presentation flap may include a respective QR code, one of which is referenced as QR code 292 in FIGS. 1 and 10A, for enabling automatic access to information, for example, via the internet, for material safety information, product ordering functions, and other uses. Each presentation flap 286, may be color coded with specific colors indicating predetermined types of chemical for casual and instantaneous recognition of the contents. A QR code, bar code or other automated reference marking may be included for the purposes of refilling the bottle using an automated filling station that automatically reads the reference marking and fills the bottle with a volume of chemical solution designated by the reference marking.

Advantageously, as shown in FIG. 4, with emphasis toward the neck 116 of the bottle 110, the material portions of the neck that define the recesses 135 that rotationally lock the neck rings 284 of the labels are the same as those that define the protrusions 134 that rotationally lock the insert 144 and spray head assembly 140 therewith. Thus, the engineered material feature that defines the exterior recesses 135 and interior protrusions 134 is dual purpose, defining both a recess and a protrusion on opposite (exterior and interior) sides of the material of the neck. As shown in FIGS. 2-4, a capture feature 136, formed as an indentation in the bottle exterior near the upper neck 116, receives an edge of the flap 286 and locks the flap in a vertical plane for optimal visibility.

As non-limiting examples, with emphasis toward FIG. 10A, the label 302*a* has text indicia 304 of "BATHROOM" indicating suggested use or contents of a spray bottle assembly on which the label 300 is mounted. The other labels expressly shown in FIGS. 10A and 10B provide further examples, and many others not expressly shown are within the scope of these descriptions and drawings. In one example, with emphasis toward FIG. 10B and the example label 302*b*, the presentation flap 286 thereof is blank. The user can choose from multiple preprinted labels to apply, the preprinted information corresponding to the type of chemical contained in the bottle by user choice. A blank is provided for custom user labeling.

Figure 10D:
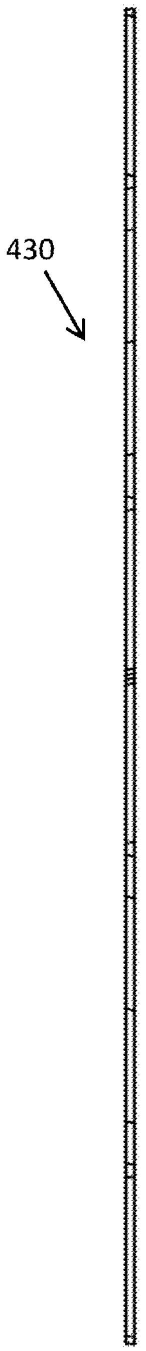
FIG. 10D is an elevation view of either side of the multi-label strip of FIG. 10C.
Figure 10E:
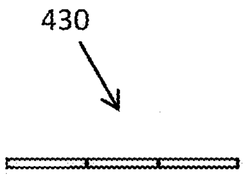
FIG. 10E is an elevation view of either end of the multi-label strip of FIG. 10C.

FIG. 10C-10H show a multi-label strip 430 in various views without text or graphical indicia to represent, for example, the label strip 300 before such indicia is applied or to represent a label strip generically with or without indicia. FIG. 10D can be viewed as either side of the multi-label strip of FIG. 10C. Another side view is not expressly shown in the drawings, but would appear as a mirror image of that shown in FIG. 10D, thus having a shape and appearance that would be evident from the one shown. Similarly, FIG. 10E can be viewed as either end of the multi-label strip of FIG. 10C. Another end view is not expressly shown in the drawings, but would appear as a mirror image of that shown in FIG. 10E.

Figure 10F:
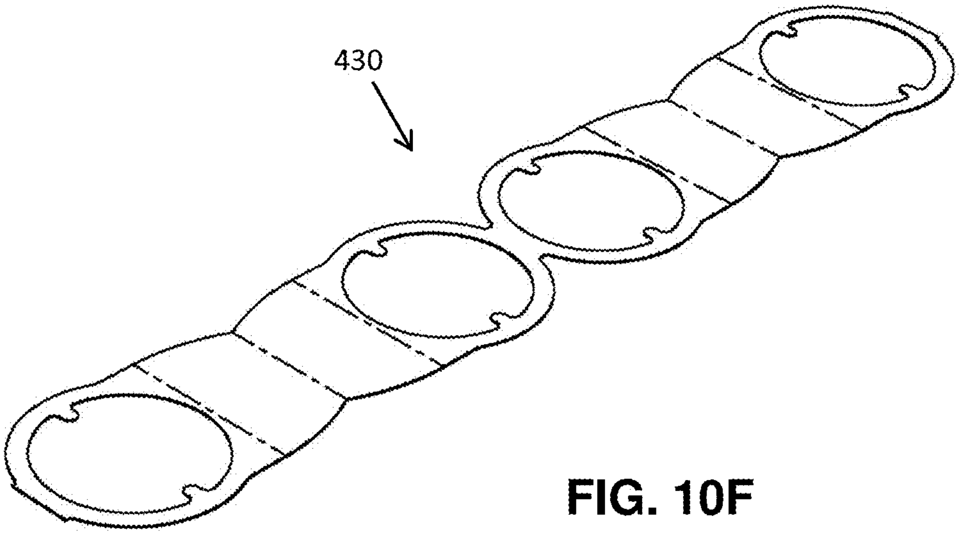
FIG. 10F is a perspective view of the multi-label strip of FIG. 10C.
Figure 10G:
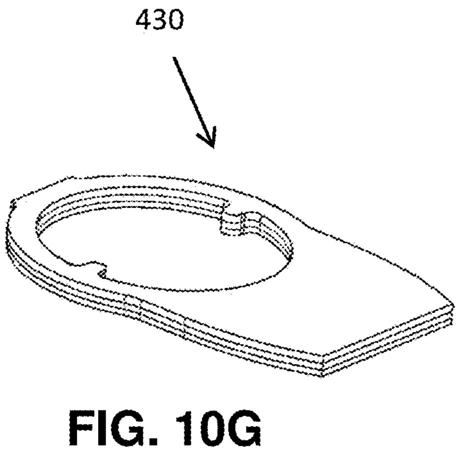
FIG. 10G is a perspective view of the multi-label strip of FIG. 10C in a multi-folded condition.
Figure 10H:
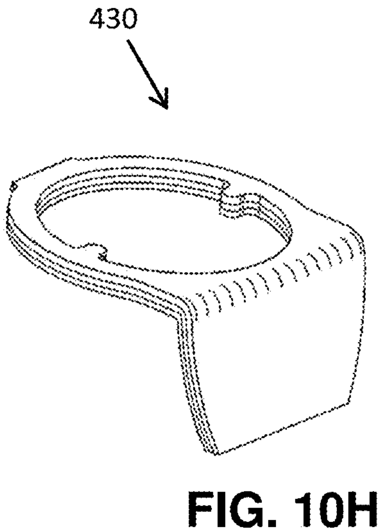
FIG. 10H is a perspective view of the multi-label strip, as in FIG. 10G, with a final bend applied for mounting, as a non-limiting example, on a spray bottle assembly as in FIGS. 1-3 or other spray bottles.

The multi-label strip 430 can be transitioned from a flat condition as in FIG. 10F, to an in use condition, as represented in FIGS. 1-3, by a user selecting a particular side and label thereof for presentation, and applying multiple folds accordingly. In FIG. 10G, the label strip is folded to present a selected label. In FIG. 10H, a final bend is applied to prepare the label strip for mounting, as a non-limiting example, on a spray bottle assembly as in FIGS. 1-3 or other spray bottles.

Figure 11:
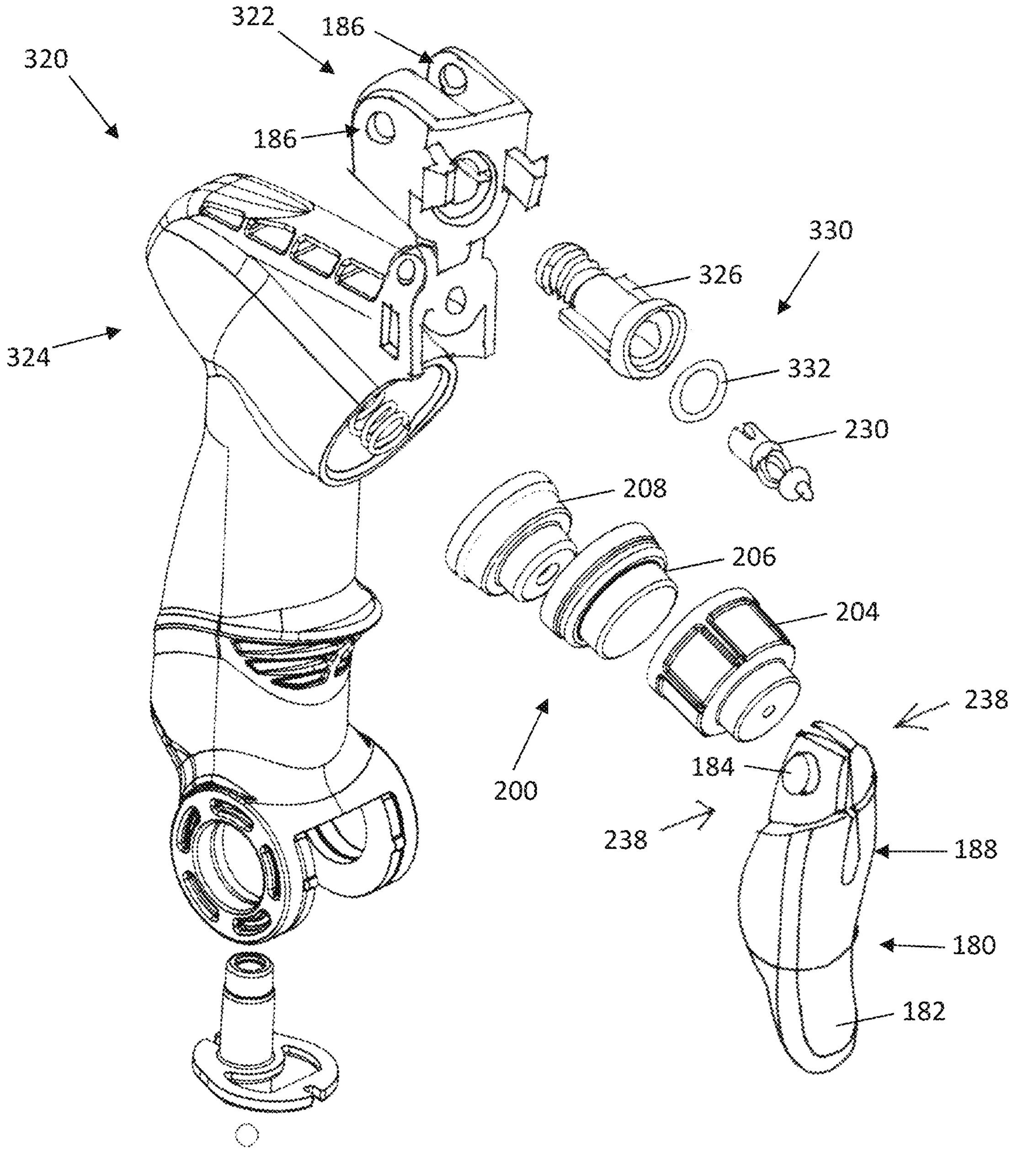
FIG. 11 is an exploded perspective view of a spray head assembly, according to at least one embodiment, with a pivoting assembly thereof pivoted to an open position.
Figure 12:
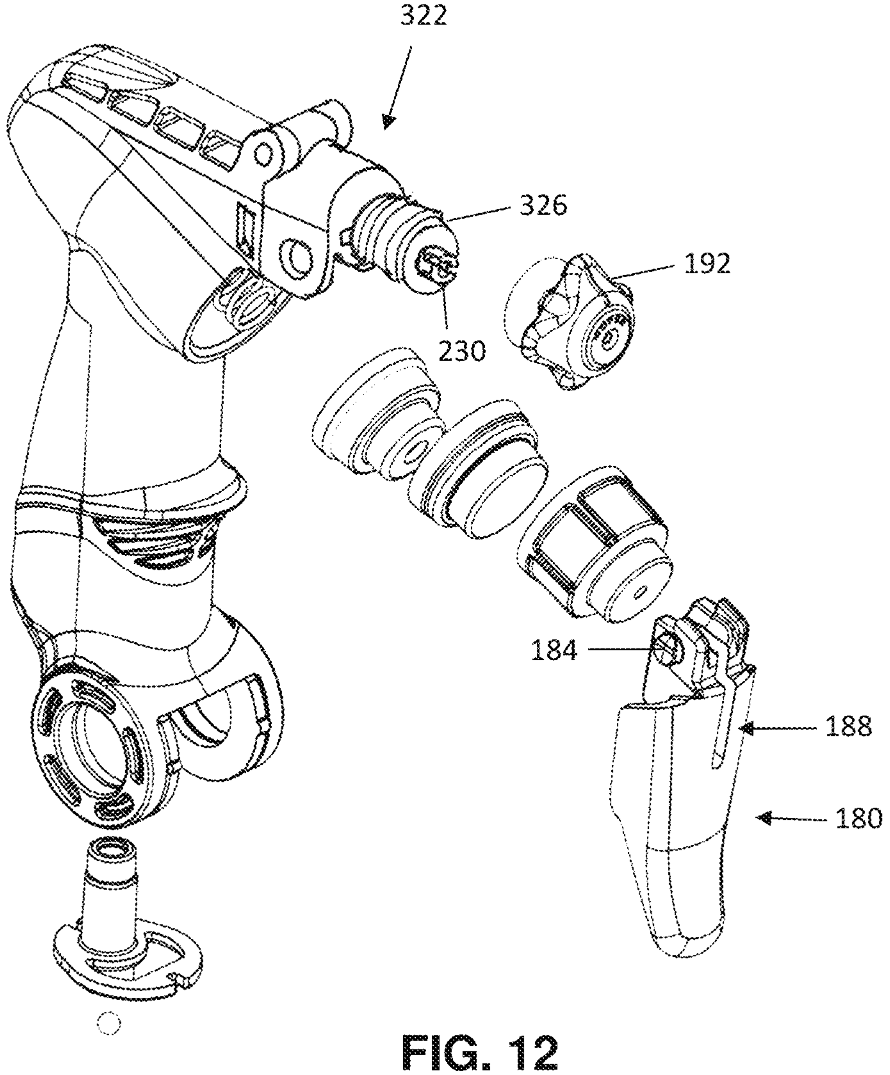
FIG. 12 is an exploded perspective view of the spray head assembly of FIG. 11, with the pivoting assembly pivoted and snapped into its closed position thereby capturing the spinner carrier assembly.
Figure 13A:
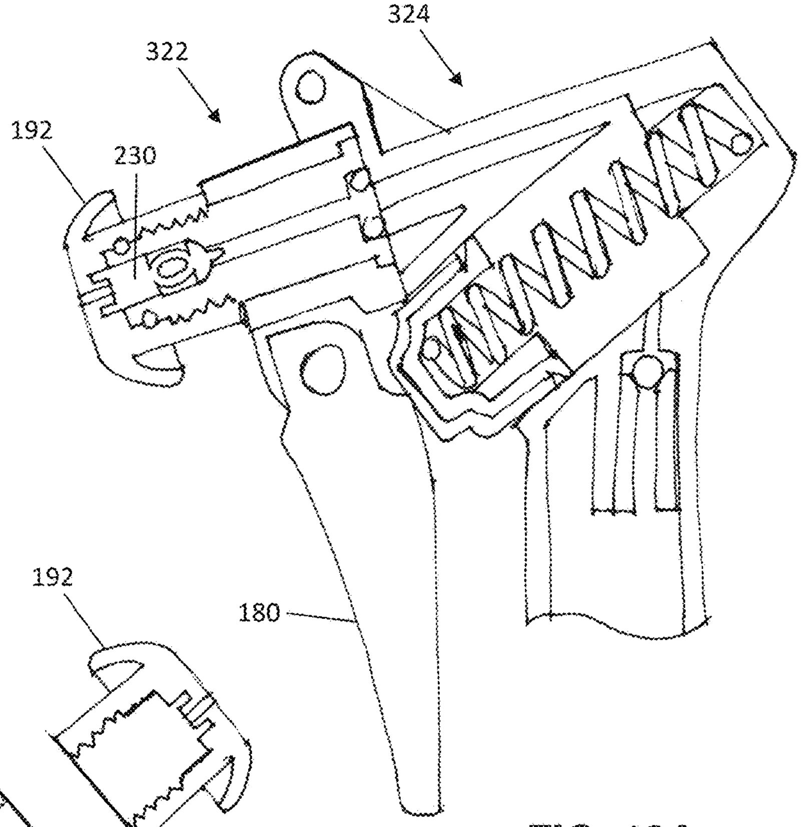
FIG. 13A is a cross sectional view of the spray head assembly of FIG. 11 as assembled with the spray head in its closed position thereby capturing the spinner carrier.
Figure 13B:
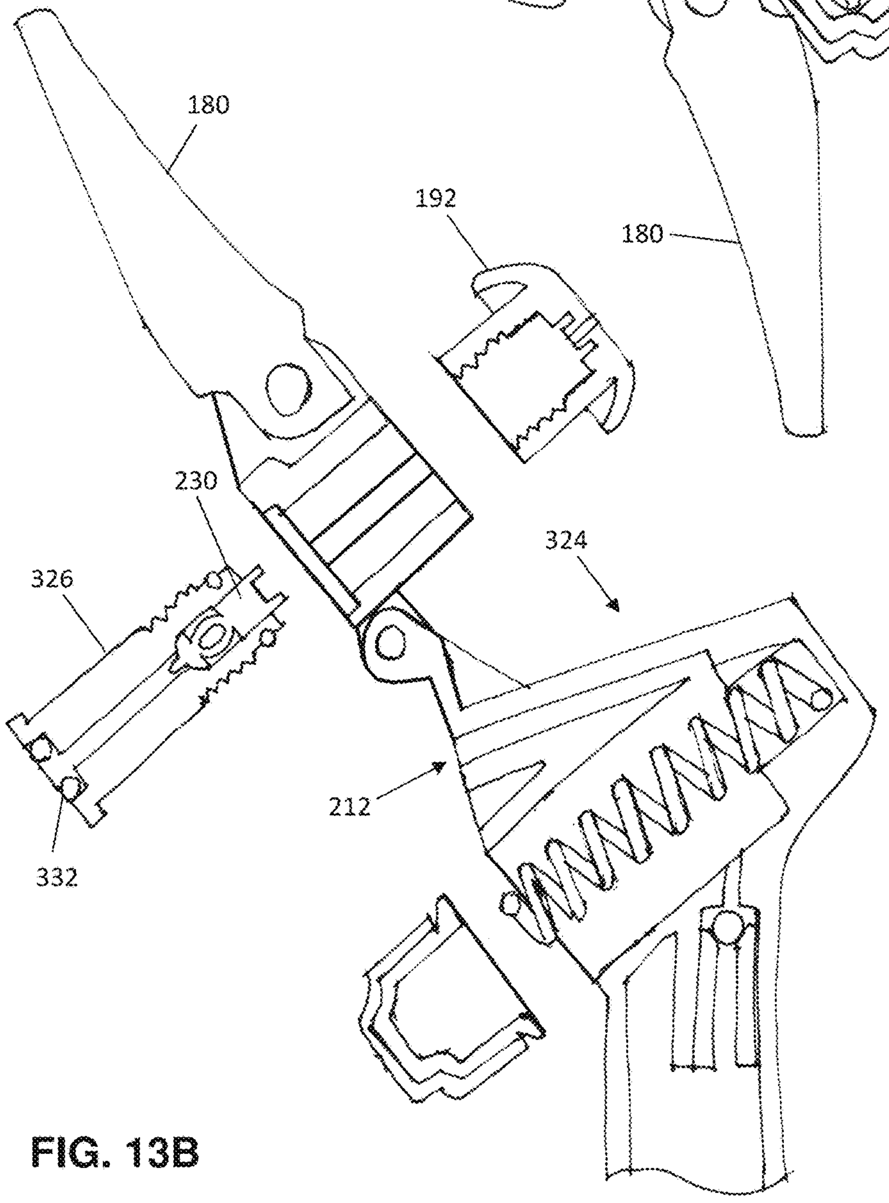
FIG. 13B is a cross sectional view of the spray head assembly of FIG. 11, with the spray head thereof pivoted to the open position and the spinner carrier removed.

FIGS. 11, 12, and 13A-13B show a spray head assembly 320, according to another embodiment, having a pivoting assembly 322 that hinges away from the rearward end of the spray head 324, carrying the trigger 180, spinner carrier 326, spinner 230 and nozzle 192. The spinner carrier 326 receives the spinner 230 such that it seals. The combination of the spinner 230 and spinner carrier 240, referenced as the spinner carrier assembly 330, are housed within the pivoting assembly 322 that allows the spinner carrier assembly 330 to be easily removed and replaced. An O-ring 332 (FIG. 11) seals the rearward end of the spinner carrier assembly 330 against the forward end of the spray head 324 when the pivoting assembly 322 is snapped closed (FIG. 12), thereby capturing the spinner carrier assembly 330. In that position, the threaded forward end of the spinner carrier 326 extends forward and the nozzle 192 can be screwed onto it. As in FIG. 6, the proximal end of the trigger 180 in FIG. 11 is compressed side to side, for example by hand as represented in FIG. 11 by arrows 238, narrowing the slot 188 and permitting the posts 184 to enter or exit the mounting holes 186. The pivoting of the pivoting assembly 322 also allows easy access for the removal of the rigid piston 204, a flexible piston seal 206, piston backer 208, and spring 202 for removal or replacement.

The spray bottle assemblies described above, particularly illustrated, and suggested by same in view of the full scope of these descriptions and drawings, are serviceable, having replaceable components that accessible for cleaning, servicing, and replacement. Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A spray bottle assembly comprising:

a bottle for containing a liquid, the bottle having a neck comprising a recess disposed along a height of an exterior portion thereof;

a spray head assembly having a base cap configured to removably attach to the neck of the bottle, and a spray head pivotally attached to the base cap, the base cap comprising at least one feature that rotationally locks the base cap relative to the neck of the bottle to constrain the spray head to pivoting in a predetermined vertical plane, wherein:

the base cap comprises an insert for placement in the neck of the bottle, and wherein the at least one feature that rotationally locks the base cap comprises at least one notch in the insert; and the neck of the bottle comprises an interior protrusion received in the notch; and the spray bottle assembly further comprises a collar that secures the base cap to the neck of the bottle by rotating the collar relative to the neck of the bottle, and wherein the interior protrusion received in the notch prevents the base cap from rotating relative to the neck of the bottle when the collar is rotated and thereby tightened; and a label comprising a ring for positioning on the neck of the bottle, the ring comprising at least one inward extending tab received by the recess.

2. The spray bottle assembly of claim 1, wherein the spray head assembly comprises a handle to which the spray head is connected, the handle pivotally attached to the base cap by a hinge that permits pivoting of the handle and spray head in the predetermined vertical plane.

3. The spray bottle assembly of claim 2, wherein the hinge permits the spray head assembly to pivot to a stowed position for carrying or compact storage.

4. The spray bottle assembly of claim 1, wherein the spray head and the bottle interact to comprise a security protrusion configured to lock the spray head assembly in a stowed position.

5. The spray bottle assembly of claim 4, wherein the security protrusion is mounted on a rotatable nozzle, wherein rotation of the nozzle locks and unlocks the spray head assembly at the stowed position by respectively positioning and removing the security protrusion from a groove defined by the bottle.

6. The spray bottle assembly of claim 1, wherein the spray head assembly comprises a nozzle and an operable trigger, wherein actuation of the trigger causes dispensation of solution from the bottle through the nozzle.

7. The spray bottle assembly of claim 6, wherein the trigger is compressible side to side to make the trigger removable from the spray head assembly.

8. The spray bottle assembly of claim 6, wherein the spray head assembly comprises a spinner rotationally driven by fluid flow as the solution is dispensed, wherein the spinner facilitates an angularly even distribution of the solution through the nozzle.

9. The spray bottle assembly of claim 1, the recess is disposed along the height of an exterior portion of the neck opposite an interior portion having the interior protrusion.

10. The spray bottle assembly of claim 1, wherein the ring further comprises at least one feature that rotationally locks the label relative to the neck.

11. A spray bottle assembly comprising:

a bottle for containing a liquid, the bottle having a neck; and a spray head assembly having a base cap configured to removably attach to the neck of the bottle, and a spray head pivotally attached to the base cap, the base cap comprising at least one feature that rotationally locks the base cap relative to the neck of the bottle to constrain the spray head to pivoting in a predetermined vertical plane, wherein:

the base cap comprises an insert for placement in the neck of the bottle, and wherein the at least one feature that rotationally locks the base cap comprises at least one notch in the insert; and the neck of the bottle comprises an interior protrusion received in the notch; and the spray bottle assembly further comprises a collar that secures the base cap to the neck of the bottle by rotating the collar relative to the neck of the bottle, and wherein the interior protrusion received in the notch prevents the base cap from rotating relative to the neck of the bottle when the collar is rotated and thereby tightened; and a label comprising a ring, for positioning on the neck of the bottle, a presentation flap perpendicular to the label ring by means of a preformed bend or fold line disposed between the ring and presentation flap, wherein the bottle includes a protrusion disposed away from an exterior surface of the bottle, an edge of the presentation flap disposed between the bottle surface and the protrusion.

12. The spray bottle assembly of claim 11, wherein the spray head assembly comprises a handle to which the spray head is connected, the handle pivotally attached to the base cap by a hinge that permits pivoting of the handle and spray head in the predetermined vertical plane.

13. The spray bottle assembly of claim 12, wherein the hinge permits the spray head assembly to pivot to a stowed position for carrying or compact storage.

14. The spray bottle assembly of claim 11, wherein the spray head and the bottle interact to comprise a security protrusion configured to lock the spray head assembly in a stowed position.

15. The spray bottle assembly of claim 14, wherein the security protrusion is mounted on a rotatable nozzle, wherein rotation of the nozzle locks and unlocks the spray head assembly at the stowed position by respectively positioning and removing the security protrusion from a groove defined by the bottle.

16. The spray bottle assembly of claim 11, wherein the spray head assembly comprises a nozzle and an operable trigger, wherein actuation of the trigger causes dispensation of solution from the bottle through the nozzle.

17. The spray bottle assembly of claim 16, wherein the trigger is compressible side to side to make the trigger removable from the spray head assembly.

18. The spray bottle assembly of claim 16, wherein the spray head assembly comprises a spinner rotationally driven by fluid flow as the solution is dispensed, wherein the spinner facilitates an angularly even distribution of the solution through the nozzle.

* * * * *